United States Patent
Sun

(10) Patent No.: US 9,746,653 B2
(45) Date of Patent: Aug. 29, 2017

(54) IMAGING LENS AND IMAGING APPARATUS

(71) Applicant: FUJIFILM Corporation, Tokyo (JP)

(72) Inventor: Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 14/940,271

(22) Filed: Nov. 13, 2015

(65) Prior Publication Data

US 2016/0139384 A1    May 19, 2016

(30) Foreign Application Priority Data

Nov. 17, 2014  (JP) ................................. 2014-232680

(51) Int. Cl.
*G02B 15/22*   (2006.01)
*G02B 13/04*   (2006.01)
*G02B 15/177*  (2006.01)

(52) U.S. Cl.
CPC ............. *G02B 15/22* (2013.01); *G02B 13/04* (2013.01); *G02B 15/177* (2013.01)

(58) Field of Classification Search
CPC ....... G02B 15/177; G02B 13/04; G02B 13/16
USPC ................ 359/680, 689, 784, 682, 651, 753
See application file for complete search history.

(56) References Cited

U.S. PATENT DOCUMENTS

| | | | |
|---|---|---|---|
| 4,806,003 A | 2/1989 | Mukai et al. | |
| 7,054,069 B1 * | 5/2006 | Gupta | G02B 15/177 359/649 |
| 7,551,367 B2 * | 6/2009 | Harada | G02B 13/06 359/683 |
| 8,179,617 B2 * | 5/2012 | Sugita | G02B 13/04 359/749 |
| 2009/0015938 A1 | 1/2009 | Harada | |
| 2015/0116848 A1 * | 4/2015 | Yamada | G02B 13/04 359/749 |

FOREIGN PATENT DOCUMENTS

| | | | | |
|---|---|---|---|---|
| JP | S63-061213 A | 3/1988 | | |
| JP | 2009-020341 A | 1/2009 | | |
| JP | 5104084 B2 | 10/2012 | | |
| WO | WO2014/006844 | * | 1/2014 | ............. G02B 13/04 |

* cited by examiner

*Primary Examiner* — Zachary Wilkes
(74) *Attorney, Agent, or Firm* — Studebaker & Brackett PC

(57) ABSTRACT

An imaging lens is constituted by, in order from the object side to the image side: a first lens group having a negative refractive power; a second lens group having a positive refractive power; a stop; and a third lens group having a positive refractive power or a negative refractive power. The first lens group has at least two positive lenses, a first positive lens from among the at least two positive lenses being positioned most toward the object side, and three negative lenses being consecutively provided adjacent to the first positive lens at the image side thereof. The first lens group is fixed with respect to an imaging surface, and focusing operations are performed by moving the second lens group and the third lens group.

15 Claims, 14 Drawing Sheets

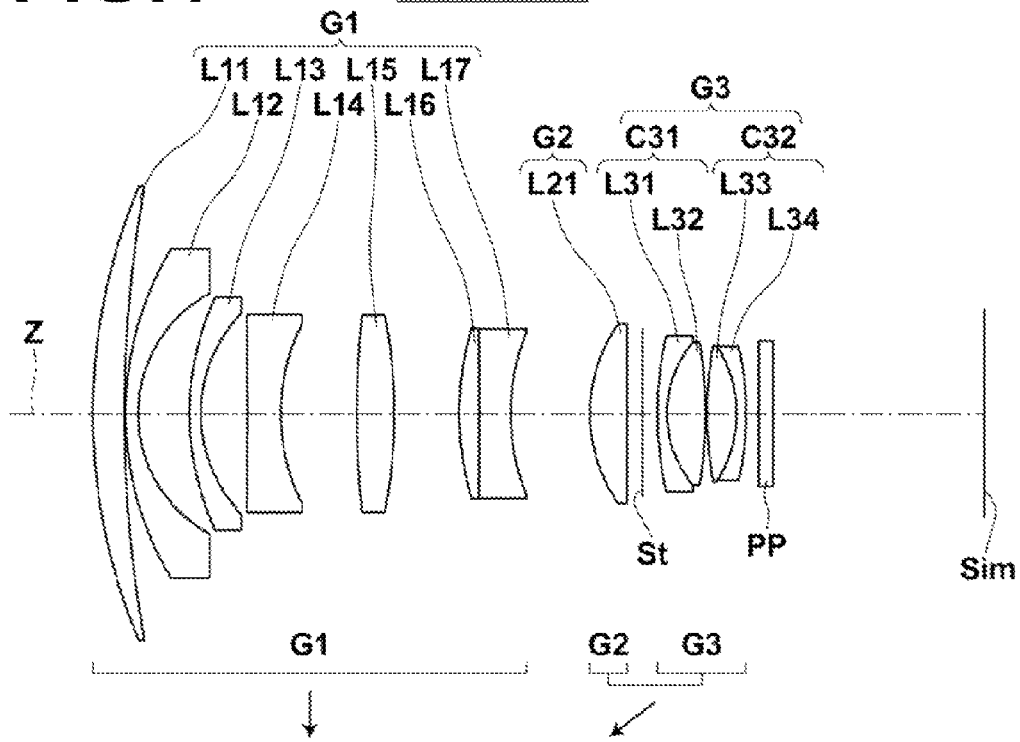
FIG.1 EXAMPLE 1
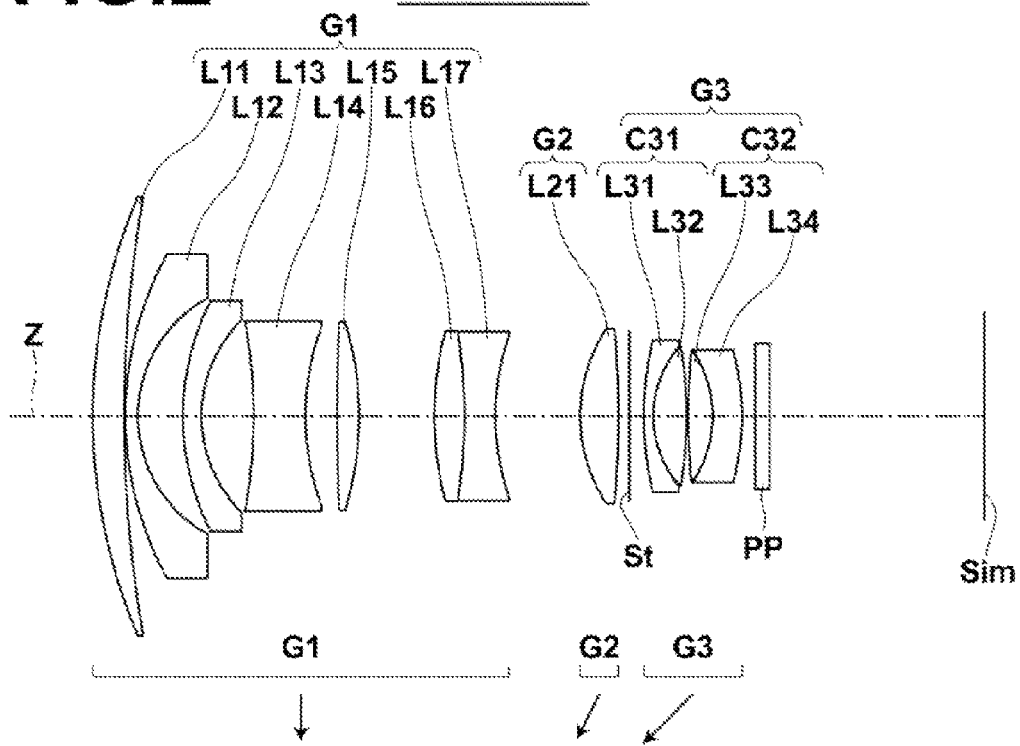
FIG.2 EXAMPLE 2

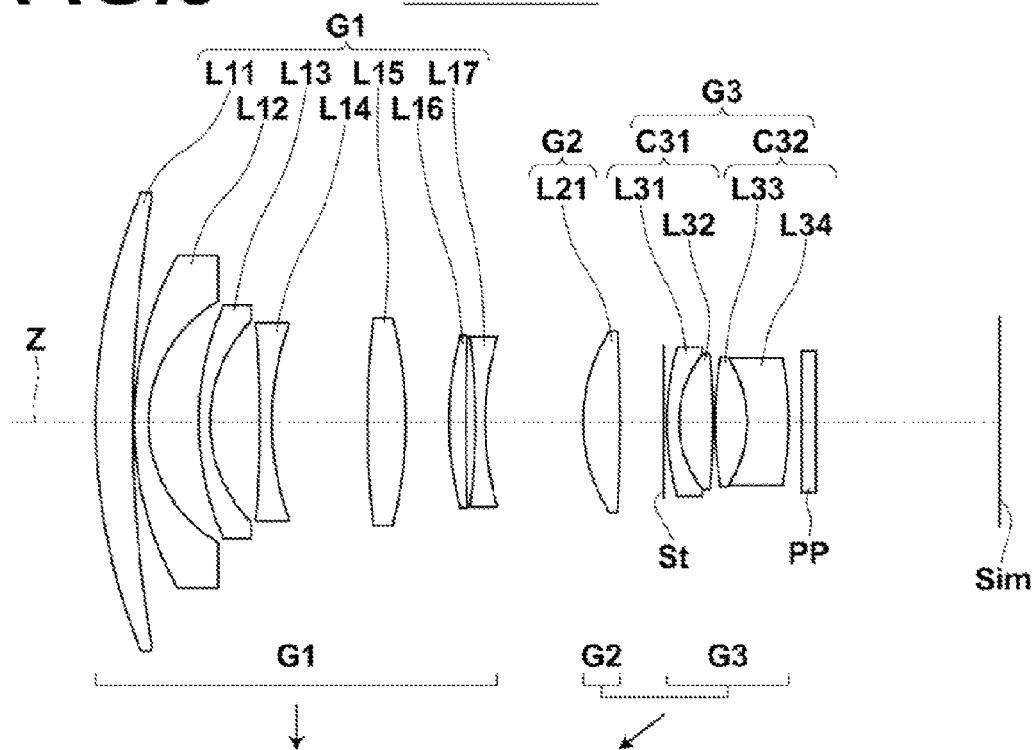
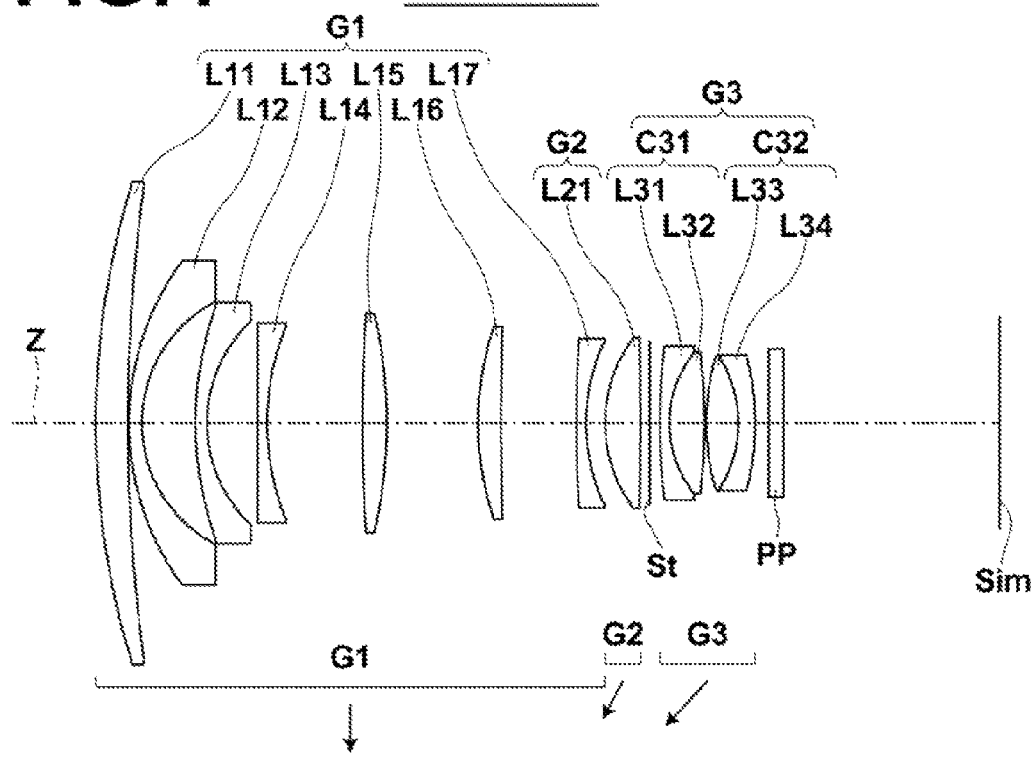

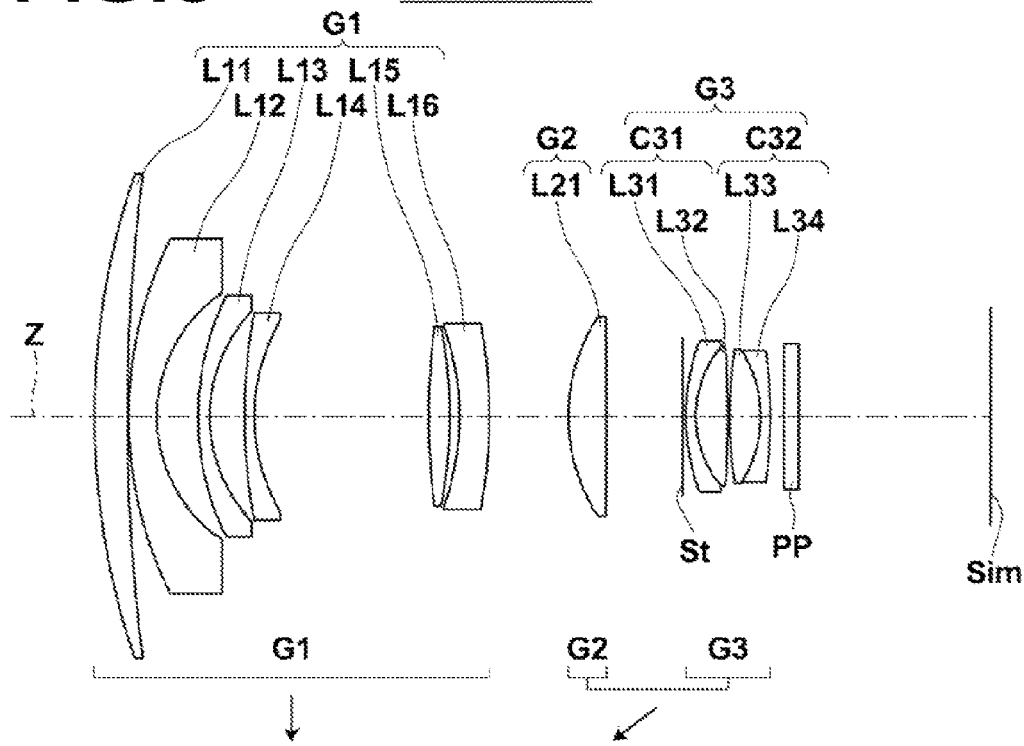
FIG.5 EXAMPLE 5
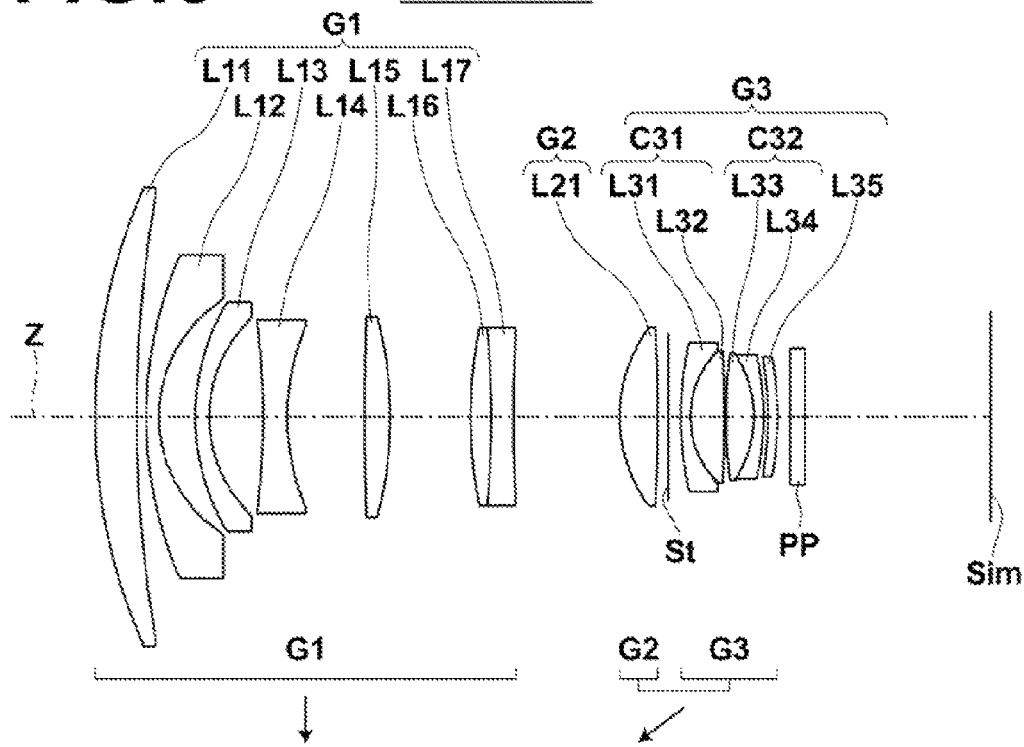
FIG.6 EXAMPLE 6

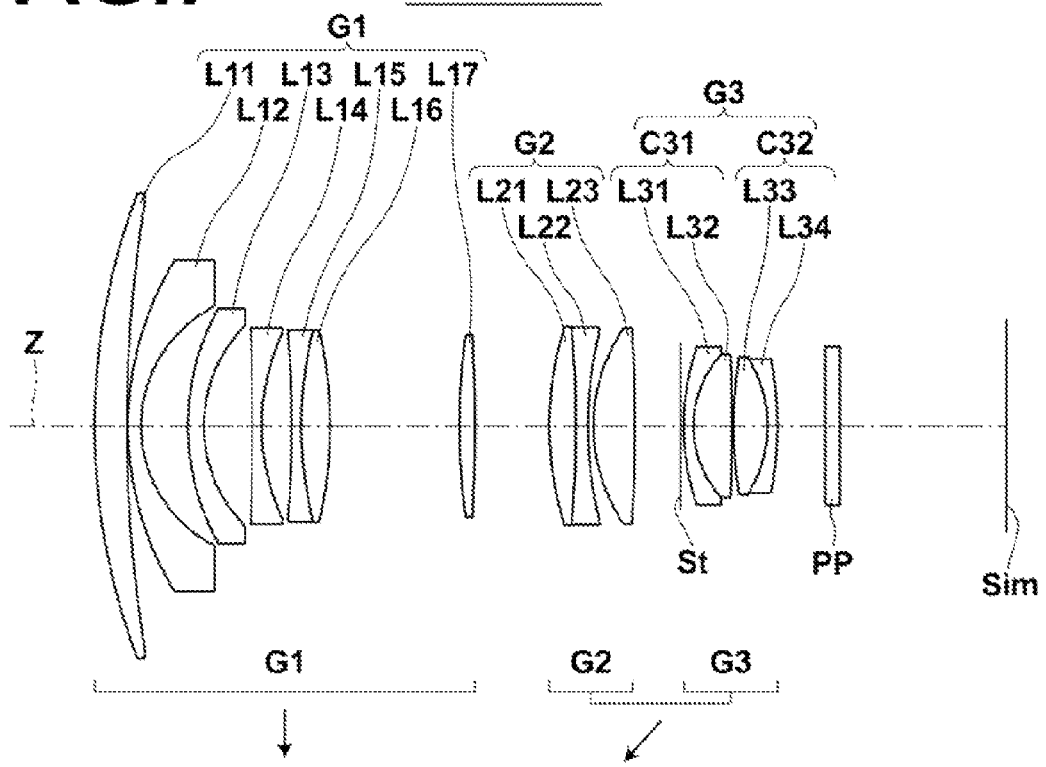
FIG.7 EXAMPLE 7
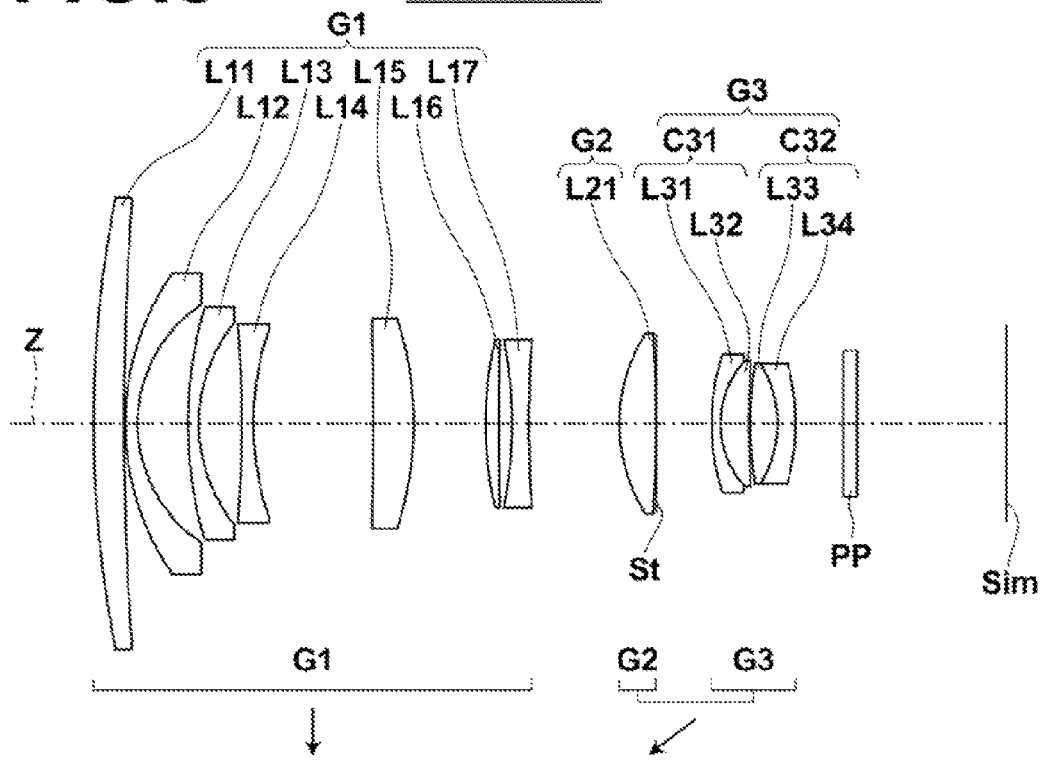
FIG.8 EXAMPLE 8

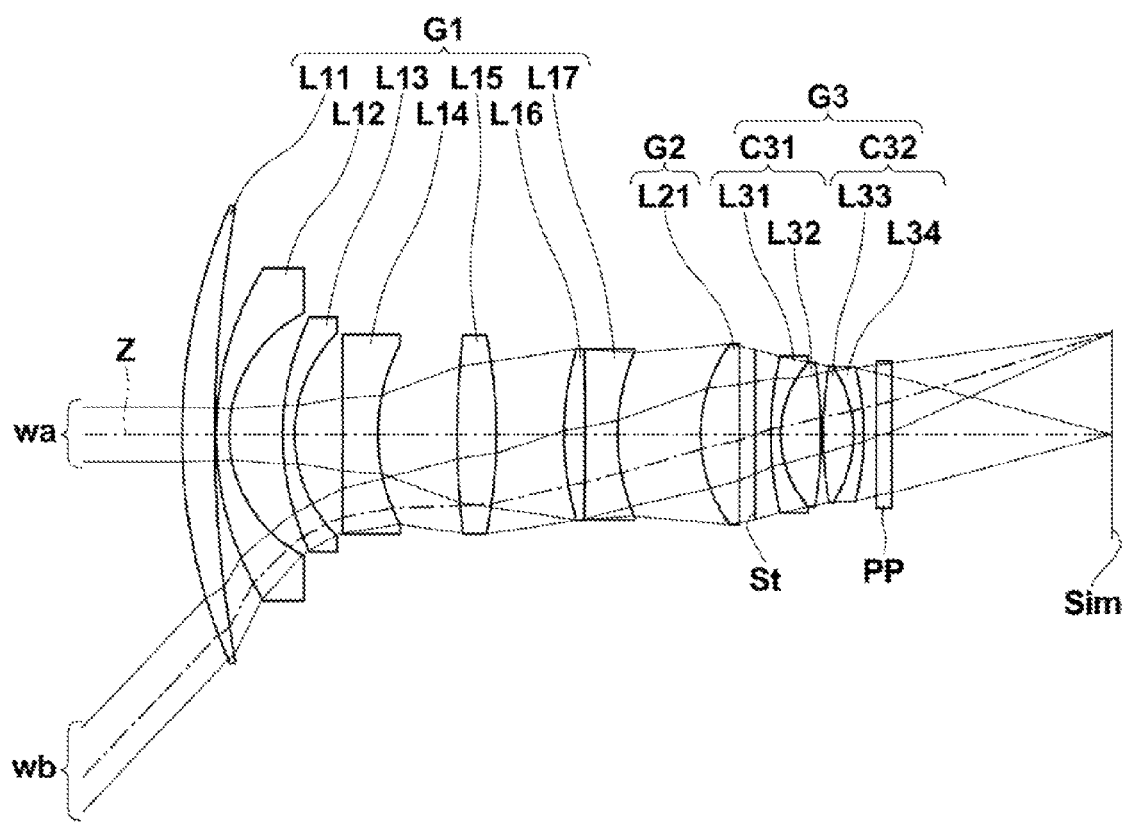
FIG.9  EXAMPLE 1

FIG.10
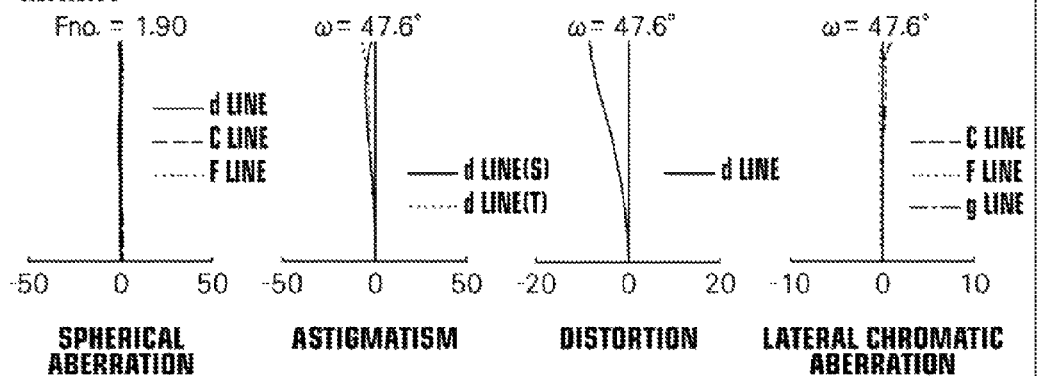
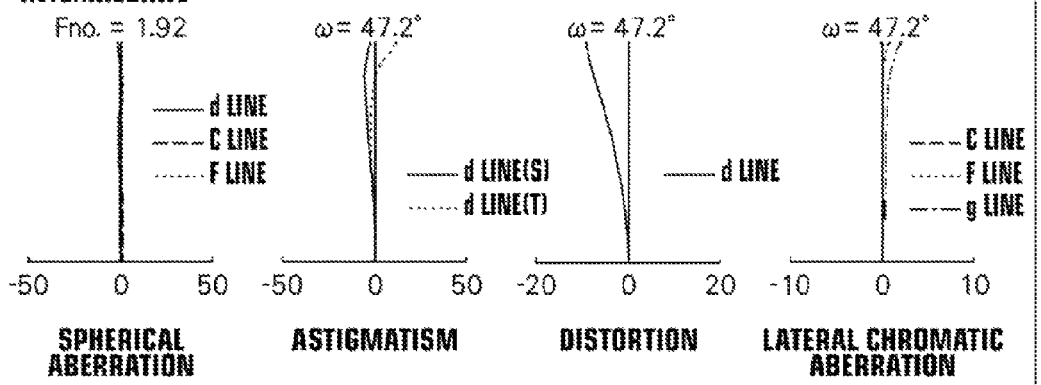
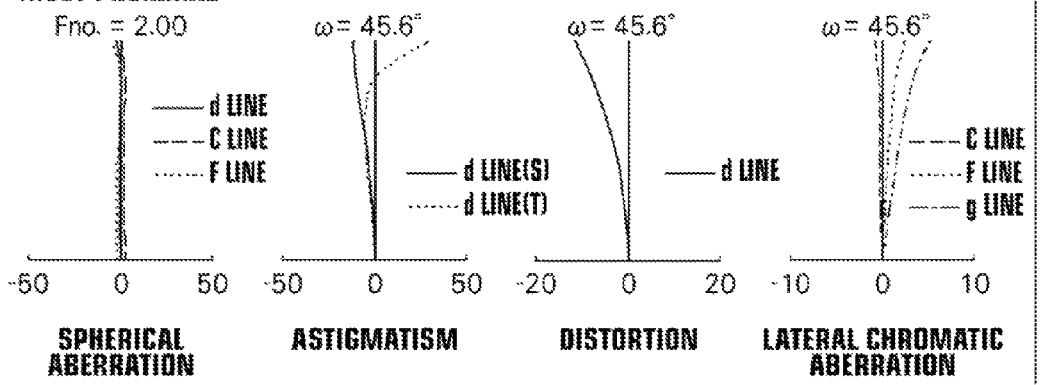

FIG.11
EXAMPLE 2
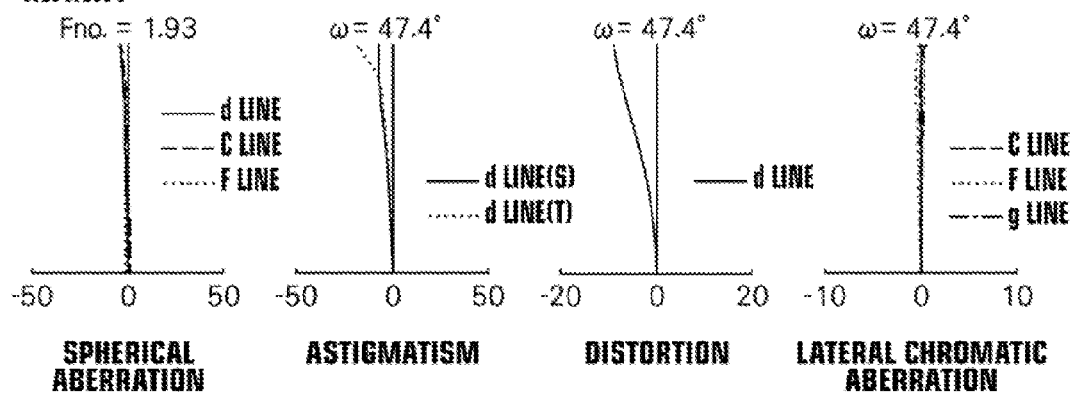
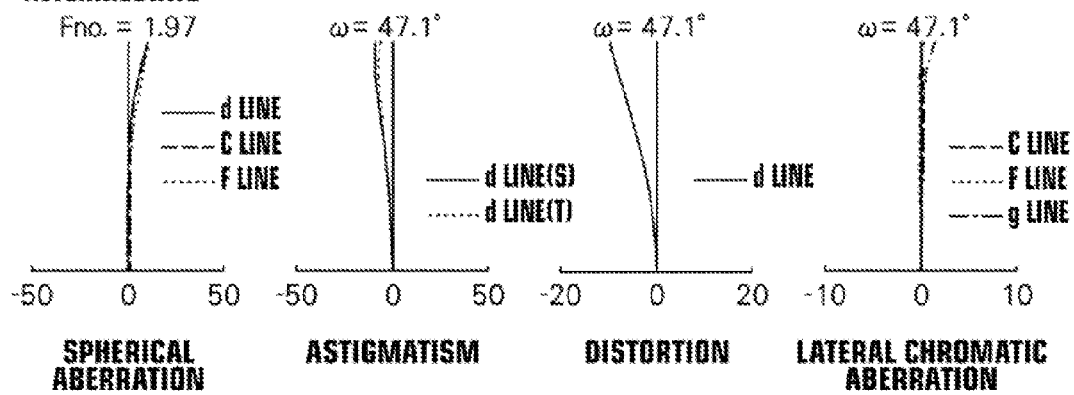
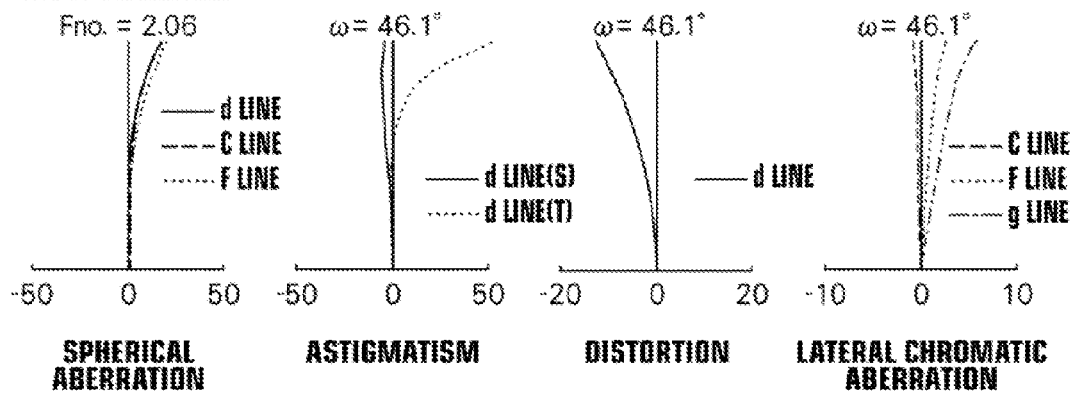

FIG.12
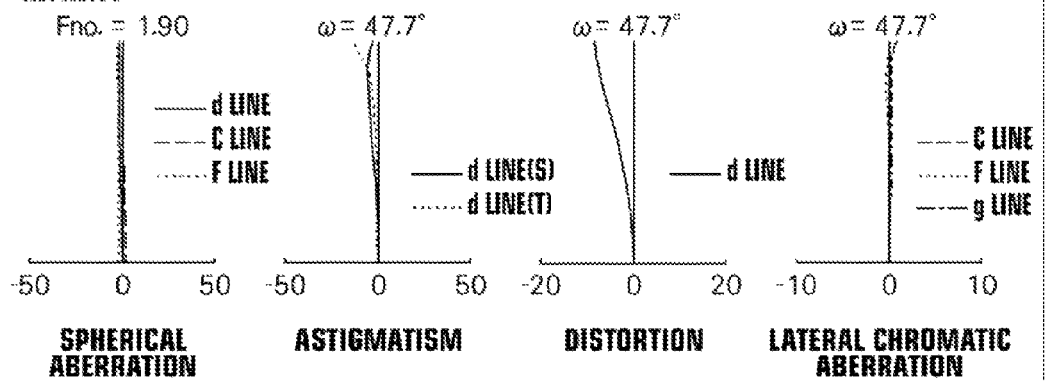
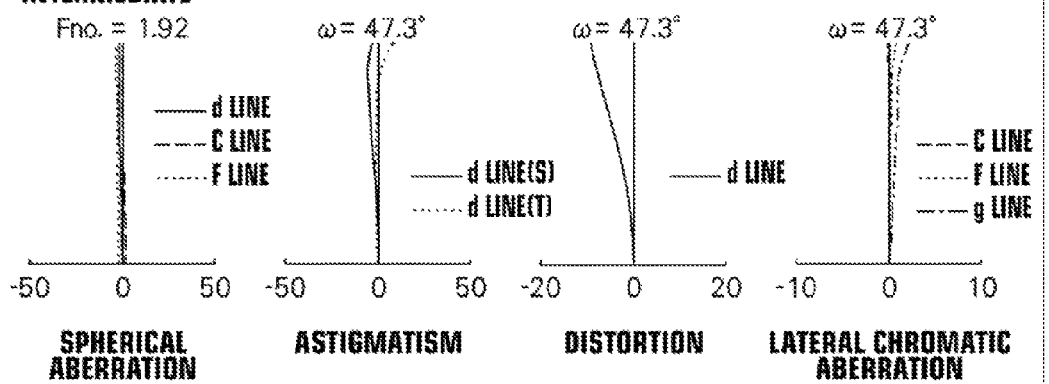
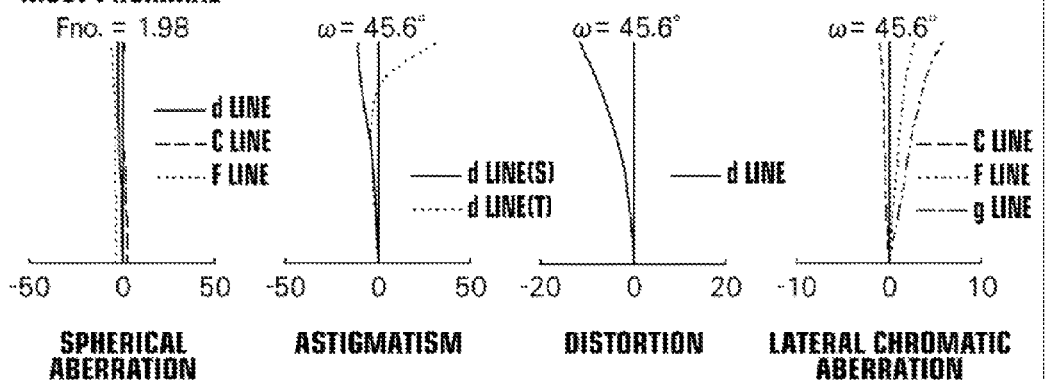

FIG.15
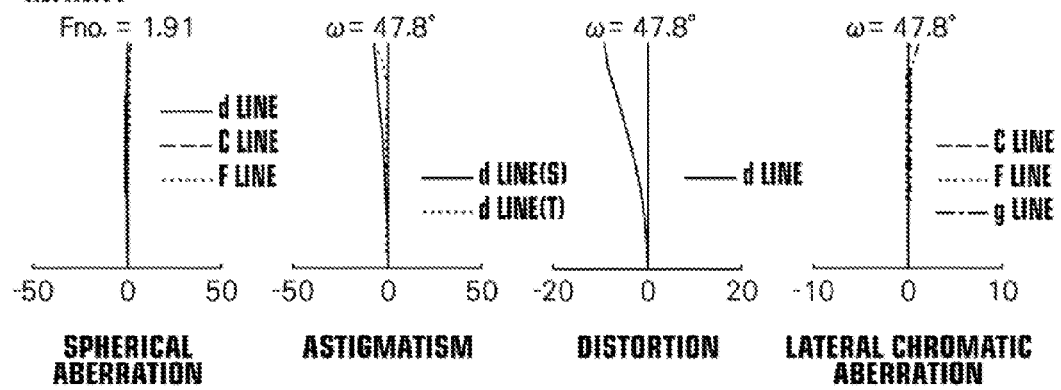
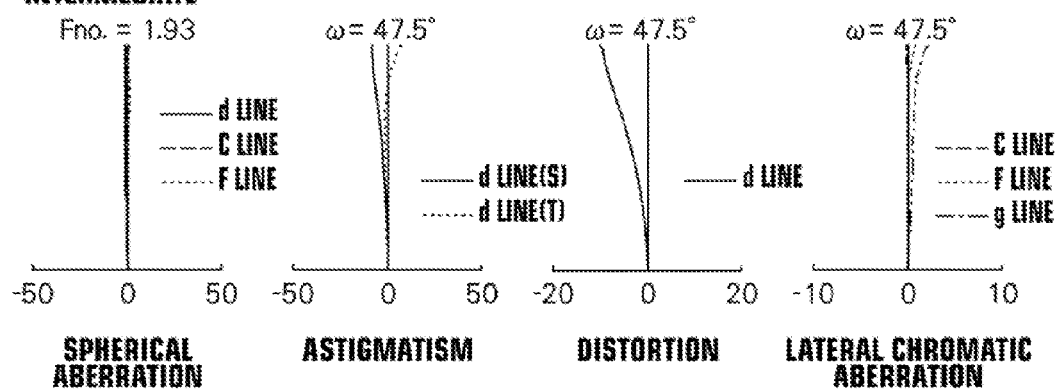
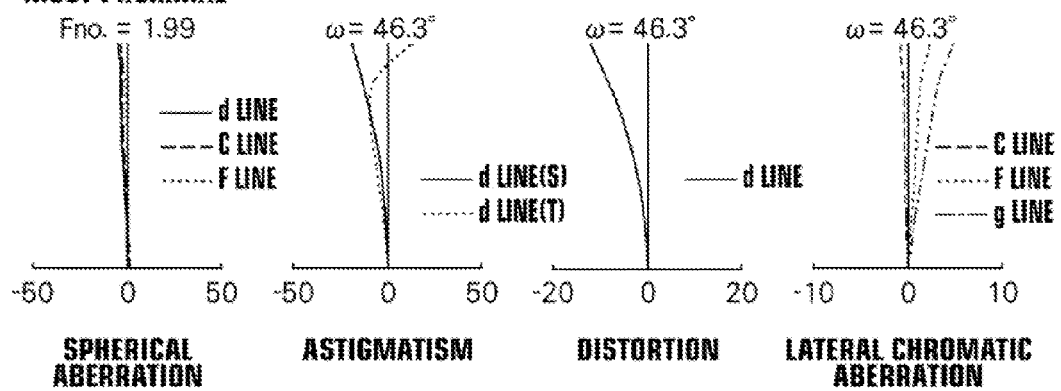

FIG.16
EXAMPLE 7
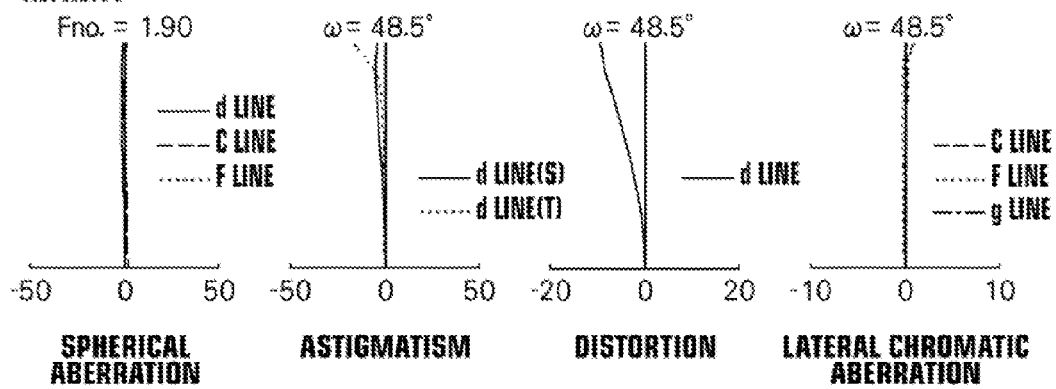
INFINITY
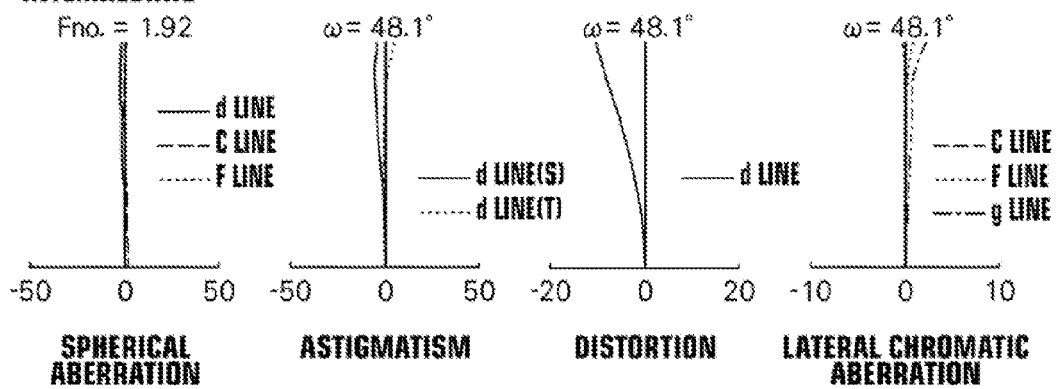
INTERMEDIATE
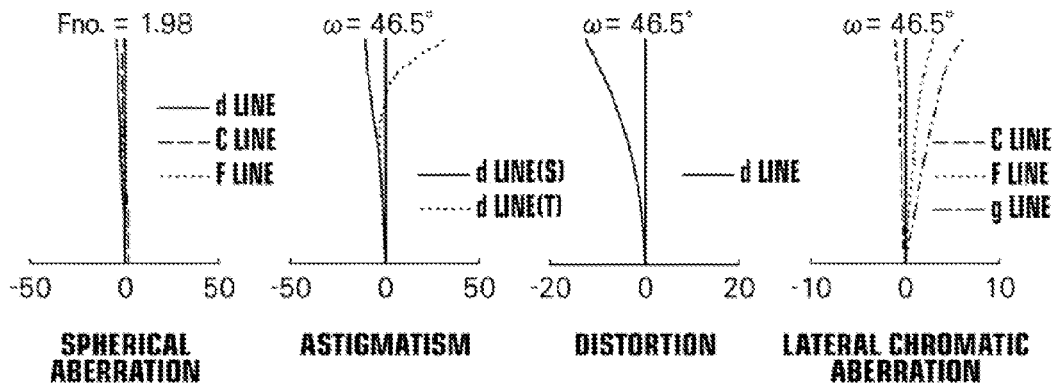
MOST PROXIMAL

IMAGING LENS AND IMAGING APPARATUS

CROSS REFERENCE TO RELATED APPLICATIONS

The present application claims priority under 35 U.S.C. §119 to Japanese Patent Application No. 2014-232680 filed on Nov. 17, 2014. The above application is hereby expressly incorporated by reference, in its entirety, into the present application.

BACKGROUND

The present disclosure is related to an imaging lens which is favorably suited for use in electronic cameras, such as video cameras, cinema cameras, digital cameras, and surveillance cameras. The present disclosure is also related to an imaging apparatus equipped with this imaging lens.

Recently, cinema cameras and digital cameras are progressively becoming compatible with the 4K and 8K formats. There is demand for lenses which are compatible with a greater number of pixels and in which various aberrations are favorably corrected, as imaging lenses to be employed in such cameras.

Known imaging lenses for use in electronic cameras, such as cinema cameras, digital cameras, video cameras, and surveillance cameras, are disclosed in Japanese Patent No. 5104084 and Japanese Unexamined Patent Publication No. 63(1988)-061213. Both of Japanese Patent No. 5104084 and Japanese Unexamined Patent Publication No. 63(1988)-061213 disclose imaging lenses having a three group configuration.

SUMMARY

However, although the imaging lenses disclosed in Japanese Patent No. 5104084 and Japanese Unexamined Patent Publication No. 63(1988)-061213 are lenses having small F numbers, the angles of view 2ω thereof are approximately 64°, which is not wide. In addition, it cannot be said that these imaging lenses sufficiently correct various aberrations. Accordingly, there is demand for an imaging lens having a wide angle of view, and in which various aberrations are favorably corrected.

The present disclosure has been developed in view of the foregoing circumstances. The present disclosure provides an imaging lens which has a wide angle of view, and in which various aberrations are favorably corrected. In addition, the present disclosure provides an imaging apparatus equipped with this imaging lens.

The imaging lens of the present disclosure consists of, in order from the object side to the image side:
  a first lens group having a negative refractive power;
  a second lens group having a positive refractive power;
  a stop; and
  a third lens group having one of a positive refractive power and a negative refractive power;
  the first lens group having at least two positive lenses;
  a first positive lens from among the at least two positive lenses being positioned most toward the object side;
  three negative lenses being consecutively provided adjacent to the first positive lens at the image side thereof;
  the first lens group being fixed with respect to an imaging surface, and focusing operations being performed by moving the second lens group and the third lens group.

In the imaging lens of the present disclosure, it is preferable for Conditional Formula (1) below to be satisfied. Note that it is more preferable for Conditional Formula (1-1) below to be satisfied.

$$-1.2 < (R1f - R1r)/(R1f + R1r) < 0 \quad (1)$$

$$-0.8 < (R1f - R1r)/(R1f + R1r) < -0.1 \quad (1\text{-}1)$$

wherein R1f is the radius of curvature of the surface toward the object side of the first positive lens, and R1r is the radius of curvature of the surface toward the image side of the first positive lens.

In addition, it is preferable for Conditional Formula (2) below to be satisfied. Note that it is more preferable for Conditional Formula (2-1) below to be satisfied.

$$-2.5 < f1/f3 < 2.5 \quad (2)$$

$$-1.5 < f1/f3 < 1.5 \quad (2\text{-}1)$$

wherein f1 is the focal length of the first lens group, and f3 is the focal length of the third lens group.

In addition, it is preferable for Conditional Formula (3) below to be satisfied. Note that it is more preferable for Conditional Formula (3-1) below to be satisfied.

$$-1.5 < f2/f3 < 1.2 \quad (3)$$

$$-1.2 < f2/f3 < 1 \quad (3\text{-}1)$$

wherein f2 is the focal length of the second lens group, and f3 is the focal length of the third lens group.

In addition, it is preferable for Conditional Formula (4) below to be satisfied. Note that it is more preferable for Conditional Formula (4-1) below to be satisfied.

$$0.1 < f/f23 < 0.6 \quad (4)$$

$$0.2 < f/f23 < 0.5 \quad (4\text{-}1)$$

wherein f is the focal length of the entire lens system, and f23 is the combined focal length of the second lens group and the third lens group.

In addition, it is preferable for a positive lens positioned most toward the image side within the second lens group to be designated as a second positive lens, and for Conditional Formula (5) below to be satisfied. Note that it is more preferable for Conditional Formula (5-1) below to be satisfied.

$$-1.7 < (R2f - R2r)/(R2f + R2r) < -0.8 \quad (5)$$

$$-1.65 < (R2f - R2r)/(R2f + R2r) < -0.9 \quad (5\text{-}1)$$

wherein R2f is the radius of curvature of the surface toward the object side of the second positive lens, and R2r is the radius of curvature of the surface toward the image side of the second positive lens.

In addition, it is preferable for the third lens group to have, in order from the object side to the image side, a first cemented lens formed by cementing a negative meniscus lens having a convex surface toward the object side and a positive lens, provided in this order from the object side to the image side, together, and a second cemented lens formed by cementing a positive lens and a negative meniscus lens having a convex surface toward the image side, provided in this order from the object side to the image side, together, and for Conditional Formula (6) below to be satisfied. Note that it is more preferable for Conditional Formula (6-1) below to be satisfied.

$$40 < vp3 - vn3 \quad (6)$$

$$50 < vp3 - vn3 \quad (6\text{-}1)$$

wherein vp3 is the Abbe's number of the positive lens of the second cemented lens with respect to the d line, and vn3 is the Abbe's number of the negative meniscus lens of the second cemented lens with respect to the d line.

In addition, it is preferable for Conditional Formulae (7) and (8) below to be satisfied. Note that it is more preferable for Conditional Formulae (7-1) and (8) below to be satisfied.

$$-0.005\nu d1+2.01 \leq nd1 \quad (7)$$

$$-0.0059\nu d1+2.061 \leq nd1 \quad (7\text{-}1)$$

$$\nu d1<53 \quad (8)$$

wherein νd1 is the Abbe's number of the first positive lens with respect to the d line, and nd1 is the refractive index of the first positive lens with respect to the d line.

The imaging lens may be configured such that the second lens group and the third lens group approach each other when changing focus from an object at infinity to an object at a close distance. Alternatively, the second lens group, the stop, and the third lens group may move integrally during focusing operations.

An imaging apparatus of the present disclosure is characterized by being equipped with the imaging lens of the present disclosure.

Note that the expression "consists of" means that the imaging lens may include lenses that practically do not have any power, optical elements other than lenses such as a stop, a mask, a cover glass, and a filter, and mechanical components such as lens flanges, a lens barrel, an imaging element, and a camera shake correcting mechanism, in addition to the component elements listed above.

In addition, the surface shapes, the radii of curvature, and the signs of the refractive powers of the above lenses are those which are considered in the paraxial region in the case that the lenses include aspherical surfaces.

The imaging lens of the present disclosure consists of, in order from the object side to the image side: the first lens group having a negative refractive power; the second lens group having a positive refractive power; the stop; and the third lens group having one of a positive refractive power and a negative refractive power. The first lens group has at least two positive lenses. The first positive lens from among the at least two positive lenses is positioned most toward the object side. Three negative lenses are consecutively provided adjacent to the first positive lens at the image side thereof. The first lens group is fixed with respect to an imaging surface. Focusing operations are performed by moving the second lens group and the third lens group. Therefore, it is possible to configure the imaging lens to be that having a wide angle of view, and in which various aberrations are favorably corrected.

In addition, the imaging apparatus of the present disclosure is equipped with the imaging lens of the present disclosure. Therefore, the imaging apparatus of the present disclosure is capable of obtaining images having large angles of view and high image quality.

BRIEF DESCRIPTION OF THE DRAWINGS

FIG. 1 is a cross sectional diagram that illustrates the lens configuration of an imaging lens according to an embodiment of the present disclosure (common with Example 1).

FIG. 2 is a cross sectional diagram that illustrates the lens configuration of an imaging lens according to Example 2 of the present disclosure.

FIG. 3 is a cross sectional diagram that illustrates the lens configuration of an imaging lens according to Example 3 of the present disclosure.

FIG. 4 is a cross sectional diagram that illustrates the lens configuration of an imaging lens according to Example 4 of the present disclosure.

FIG. 5 is a cross sectional diagram that illustrates the lens configuration of an imaging lens according to Example 5 of the present disclosure.

FIG. 6 is a cross sectional diagram that illustrates the lens configuration of an imaging lens according to Example 6 of the present disclosure.

FIG. 7 is a cross sectional diagram that illustrates the lens configuration of an imaging lens according to Example 7 of the present disclosure.

FIG. 8 is a cross sectional diagram that illustrates the lens configuration of an imaging lens according to Example 8 of the present disclosure.

FIG. 9 is a diagram that illustrates the paths of light rays that pass through the imaging lens of Example 1.

FIG. 10 is a collection of diagrams that illustrate aberrations of the imaging lens of Example 1 of the present disclosure.

FIG. 11 is a collection of diagrams that illustrate aberrations of the imaging lens of Example 2 of the present disclosure.

FIG. 12 is a collection of diagrams that illustrate aberrations of the imaging lens of Example 3 of the present disclosure.

FIG. 15 is a collection of diagrams that illustrate aberrations of the imaging lens of Example 6 of the present disclosure.

FIG. 16 is a collection of diagrams that illustrate aberrations of the imaging lens of Example 7 of the present disclosure.

BEST MODE FOR CARRYING OUT THE DISCLOSURE

Figure 13:
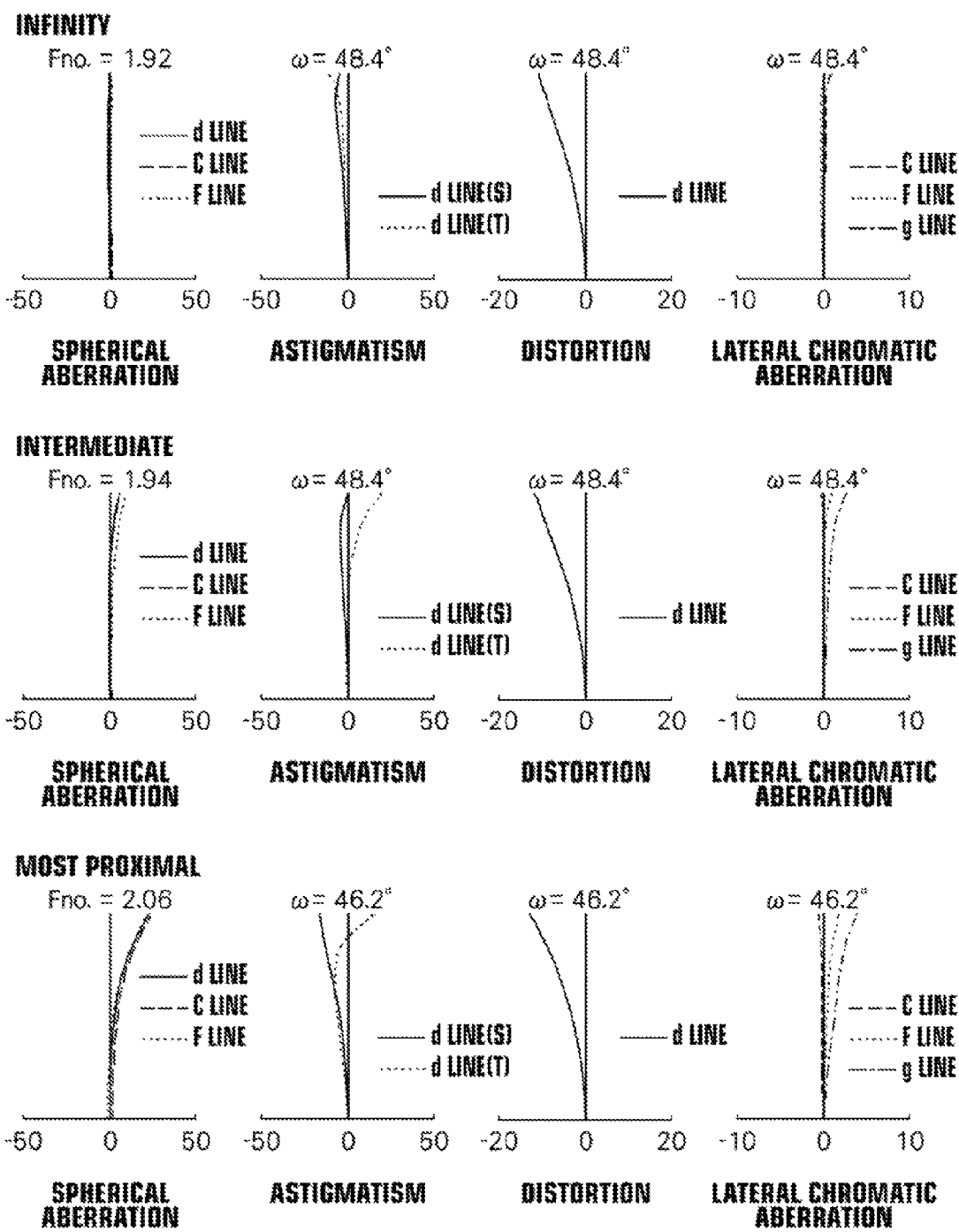
FIG. 13 is a collection of diagrams that illustrate aberrations of the imaging lens of Example 4 of the present disclosure.

Hereinafter, embodiments of the present disclosure will be described in detail with reference to the attached drawings. FIG. 1 is a cross sectional diagram that illustrates the lens configuration of an imaging lens according to an embodiment of the present disclosure, and FIG. 9 is a diagram that illustrates the paths of light rays that pass through this imaging lens. The configurations illustrated in FIGS. 1 and 9 are common with the configuration of an imaging lens according to Example 1, which will be described later. FIGS. 1 and 9 illustrate lenses which are arranged in a state focused on an object at infinity. In FIGS. 1 and 9, the left side is the object side, and the right side is the image side. The aperture stops St illustrated in FIGS. 1 and 9 do not necessarily represent the size or shape thereof, but the position of the stop along an optical axis Z. In addition, FIG. 9 illustrates an axial light beam wa and a light beam wb at a maximum angle of view.

As illustrated in FIGS. 1 and 9, this imaging lens consists of, in order from the object side to the image side, a first lens group G1 having a negative refractive power, a second lens group G2 having a positive refractive power, an aperture stop St, and a third lens group G3 having one of a positive refractive power and a negative refractive power.

When this imaging lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIGS. 1 and 9 illustrate examples in which a plane parallel plate shaped optical member PP that presumes such components is provided between the lens system and the imaging surface Sim.

The first lens group G1 has at least two positive lenses. A first positive lens L11 from among the at least two positive lenses is positioned most toward the object side. Three negative lenses L12 through L14 are consecutively provided adjacent to the first positive lens L11 at the image side thereof.

In addition, the imaging lens is configured such that the first lens group G1 is fixed with respect to an imaging surface, and focusing operations are performed by moving the second lens group G2 and the third lens group G3.

Configuring the first lens group G1 to have a negative refractive power in this manner is advantageous from the viewpoint of widening the angle of view. In addition, configuring the second lens group G2 to have a positive refractive power is advantageous from the viewpoint of correcting astigmatism which is generated in the first lens group G1. In addition, fluctuations in spherical aberration during focusing operations can be suppressed by providing the aperture stop St between the second lens group G2 and the third lens group G3.

In addition, distortion and lateral chromatic aberration can be corrected by providing the first positive lens L11 most toward the object side in the first lens group G1. A further widening of the angle of view can be achieved while suppressing aberrations, by providing the three negative lenses L12 through L14 consecutively behind the first positive lens L11. In addition, by providing a positive lens other than the first positive lens L11, balance between distortion and spherical aberration as well as balance between lateral chromatic aberration and longitudinal chromatic aberration can be achieved with the first positive lens L11 and the other positive lens.

In addition, spherical aberration and astigmatism can be corrected, by moving the second lens group G2 and the third lens group G3 during focusing operations.

In the imaging lens of the present embodiment, it is preferable for Conditional Formula (1) below to be satisfied. Conditional Formula (1) regulates the shape of the first positive lens L11. Spherical aberration can be suppressed, by configuring the first positive lens L11 such that the value of (R1f−R1r)/(R1f+R1r) is not less than or equal to the lower limit defined in Conditional Formula (1). In addition, correction of distortion and lateral chromatic aberration is facilitated, by configuring the first positive lens L11 such that the value of (R1f−R1r)/(R1 f+R1r) is not greater than or equal to the upper limit defined in Conditional Formula (1). Note that more favorable properties can be obtained if Conditional Formula (1-1) is satisfied.

$$-1.2 < (R1f-R1r)/(R1f+R1r) < 0 \quad (1)$$

$$-0.8 < (R1f-R1r)/(R1f+R1r) < -0.1 \quad (1-1)$$

wherein R1f is the radius of curvature of the surface toward the object side of the first positive lens, and R1r is the radius of curvature of the surface toward the image side of the first positive lens.

In addition, it is preferable for Conditional Formula (2) below to be satisfied. Conditional Formula (2) regulates the ratio of the refractive powers of the first lens group G1 and the third lens group G3. Field curvature and lateral chromatic aberration can be suppressed, by configuring the imaging lens such that the value of f1/f3 is not less than or equal to the lower limit defined in Conditional Formula (2). The negative refractive power of the first lens group G1 can be prevented from becoming excessively weak, by configuring the imaging lens such that the value of f1/f3 is not greater than or equal to the upper limit defined in Conditional Formula (2). As a result, astigmatism can be suppressed. Alternatively, the refractive power of the third lens group G3 can be prevented from becoming excessively strong, and as a result, the total length of the lens system can be shortened. Note that more favorable properties can be obtained if Conditional Formula (2-1) is satisfied.

$$-2.5 < f1/f3 < 2.5 \quad (2)$$

$$-1.5 < f1/f3 < 1.5 \quad (2-1)$$

wherein f1 is the focal length of the first lens group, and f3 is the focal length of the third lens group.

In addition, it is preferable for Conditional Formula (3) below to be satisfied. Conditional Formula (3) regulates the ratio of the refractive powers of the second lens group G2 and the third lens group G3. The refractive power of the second lens group G2 can be prevented from becoming excessively weak, by configuring the imaging lens such that the value of f2/f3 is not less than or equal to the lower limit defined in Conditional Formula (3). As a result, astigmatism can be suppressed. In addition, the refractive power of the third lens group G3 can be prevented from becoming excessively strong, by configuring the imaging lens such that the value of f2/f3 is not greater than or equal to the upper limit defined in Conditional Formula (3). As a result, the total length of the lens system can be shortened. Alternatively, the amount of spherical aberration which is generated by the third lens group G3 can be suppressed. Note that more favorable properties can be obtained if Conditional Formula (3-1) is satisfied.

$$-1.5 < f2/f3 < 1.2 \quad (3)$$

$$-1.2 < f2/f3 < 1 \quad (3-1)$$

wherein f2 is the focal length of the second lens group, and f3 is the focal length of the third lens group.

In addition, it is preferable for Conditional Formula (4) below to be satisfied. Conditional Formula (4) regulates the combined focal length of the second lens group G2 and the third lens group G3. The total length of the lens system can be shortened and increases in the diameters of the forward lenses can be suppressed, by configuring the imaging lens such that the value of f/f23 is not less than or equal to the lower limit defined in Conditional Formula (4). In addition, securing of back focus and correction of spherical aberration can be facilitated, by configuring the imaging lens such that the value of f/f23 is not greater than or equal to the upper limit defined in Conditional Formula (4). Note that more favorable properties can be obtained if Conditional Formula (4-1) is satisfied.

$$0.1 < f/f23 < 0.6 \quad (4)$$

$$0.2 < f/f23 < 0.5 \quad (4-1)$$

wherein f is the focal length of the entire lens system, and f23 is the combined focal length of the second lens group and the third lens group.

In addition, it is preferable for a positive lens positioned most toward the image side within the second lens group G2 to be designated as a second positive lens (lens L21 in FIG. 1), and for Conditional Formula (5) below to be satisfied. Conditional Formula (5) regulates the shape of the second positive lens, which mainly contributes to the positive refractive power of the second lens group G2. The refractive power of the second lens group G2 can be prevented from becoming excessively strong, by configuring the second positive lens such that the value of (R2f−R2r)/(R2f+R2r) is not less than or equal to the lower limit defined in Conditional Formula (5). As a result, drastic convergence of light beams which become divergent by passing through the first lens group G1 can be suppressed. Therefore, spherical aberration can be suppressed. In addition, the refractive power of the second lens group G2 can be prevented from becoming excessively weak, by configuring the second positive lens such that the value of (R2f−R2r)/(R2f+R2r) is not greater than or equal to the upper limit defined in Conditional Formula (5). As a result, astigmatism and field curvature can be suppressed. Note that more favorable properties can be obtained if Conditional Formula (5-1) below is satisfied.

$$-1.7 < (R2f-R2r)/(R2f+R2r) < -0.8 \tag{5}$$

$$-1.65 < (R2f-R2r)/(R2f+R2r) < -0.9 \tag{5-1}$$

wherein R2f is the radius of curvature of the surface toward the object side of the second positive lens, and R2r is the radius of curvature of the surface toward the image side of the second positive lens.

In addition, it is preferable for the third lens group to have, in order from the object side to the image side, a first cemented lens (cemented lens C31 in FIG. 1) formed by cementing a negative meniscus lens L31 having a convex surface toward the object side and a positive lens L32, provided in this order from the object side to the image side, together, and a second cemented lens (cemented lens C32 in FIG. 1) formed by cementing a positive lens L33 and a negative meniscus lens L34 having a convex surface toward the image side, provided in this order from the object side to the image side, together, and for Conditional Formula (6) below to be satisfied. Providing the two cemented lenses within the third lens group G3 is advantageous from the viewpoint of correcting longitudinal chromatic aberration. Particularly, the amounts of various aberrations which are generated can be suppressed if the second cemented lens toward the image side satisfies Conditional Formula (6), and such a configuration is particularly advantageous from the viewpoint of favorably correcting longitudinal chromatic aberration. Note that more favorable properties can be obtained if Conditional Formula (6-1) below is satisfied.

$$40 < vp3 - vn3 \tag{6}$$

$$50 < vp3 - vn3 \tag{6-1}$$

wherein vp3 is the Abbe's number of the positive lens of the second cemented lens with respect to the d line, and vn3 is the Abbe's number of the negative meniscus lens of the second cemented lens with respect to the d line.

In addition, it is preferable for Conditional Formulae (7) and (8) below to be satisfied. Conditional Formula (7) is a conditional formula for correcting field curvature and lateral chromatic aberration. Field curvature and lateral chromatic aberration can be corrected, by selecting a material having a high refractive index and a comparatively high dispersion that satisfies Conditional Formula (7) as the material of the first positive lens L11, which is provided most toward the object side within the first lens group G1. In addition, lateral chromatic aberration can be suppressed, by Conditional Formula (8) being satisfied. Note that more favorable properties can be obtained if Conditional Formulae (7-1) and (8) below are satisfied.

$$-0.005 vd1 + 2.01 \le nd1 \tag{7}$$

$$-0.0059 vd1 + 2.061 \le nd1 \tag{7-1}$$

$$vd1 < 53 \tag{8}$$

wherein vd1 is the Abbe's number of the first positive lens with respect to the d line, and nd1 is the refractive index of the first positive lens with respect to the d line.

The imaging lens may be configured such that the second lens group G2 and the third lens group G3 approach each other when changing focus from an object at infinity to an object at a close distance. By adopting such a configuration, fluctuations in aberration during focusing operations, particularly astigmatism, can be corrected. Alternatively, the second lens group G2, the aperture stop St, and the third lens group G3 may move integrally during focusing operations. By adopting such a configuration, the mechanism for performing focusing operations can be simplified, and therefore focusing precision can be improved.

In the case that the present imaging lens is to be utilized in a severe environment, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the imaging lens of the present disclosure will be described. First, the imaging lens of Example 1 will be described. FIG. 1 is a cross sectional diagram that illustrates the lens configuration of the imaging lens of Example 1. Note that in FIG. 1 and FIGS. 2 through 8 corresponding to Examples 2 through 8 to be described later, the left side is the object side, and the right side is the image side. In addition, the aperture stops St illustrated in FIGS. 1 through 8 do not necessarily represent the size or shape thereof, but the position of the stop along optical axes Z.

In the imaging lens of Example 1, the first lens group G1 is constituted by seven lenses, which are lenses L11 through L17. The first lens group G1 is configured to be fixed with respect to the imaging surface during focusing operations. A positive lens L11 (first positive lens L11) is provided most toward the object side. Thereby, distortion and lateral chromatic aberration can be corrected. Three negative lenses L12 through L14 are consecutively provided toward the image side of the positive lens L11. Thereby, the negative refractive power of the first lens group G1 is concentrated toward the object side, while enabling the refractive power of each of the negative lenses to be suppressed. Therefore, the angle of view can be widened while suppressing distortion. Next, a positive lens L15 is provided toward the image side of the three consecutively provided negative lenses L12 through L14. Compared to the positive lens L11, the height of marginal axial light rays is high, and the height of a principal light ray at the maximum angle of view is low. For this reason, the positive lens L11 has a greater correcting effect with respect to distortion and lateral chromatic aberration, while the positive lens L15 has a greater correcting effect with respect to spherical aberration and longitudinal chromatic aberration. Balance between distortion and spherical aberration as well as balance between lateral chromatic aberration and longitudinal chromatic aberration can be achieved by adopting this configuration. Next, a cemented lens formed by cementing a positive lens L16 having a small Abbe's number and a negative lens L17 having a large Abbe's number together is provided toward the image side of the positive lens L15. Thereby, longitudinal chromatic aberration and lateral chromatic aberration which are generated at the negative lenses L12 through L14 are corrected.

The second lens group G2 is constituted only by a positive lens L21. The second lens group G2 principally functions to cause divergent light beams from the first lens group G1 to become convergent light beams. The effective diameter of the aperture stop St can be maintained small by providing a positive refractive power toward the object side of the aperture stop St. Therefore, this configuration contributes to miniaturization of a stop mechanism.

The third lens group G3 is constituted by a cemented lens C31 (first cemented lens) formed by cementing a negative meniscus lens L31 having a convex surface toward the object side and a biconvex positive lens L32 together, and a cemented lens C32 (second cemented lens) formed by cementing a biconvex positive lens L33 and a negative meniscus lens L34 having a convex surface toward the image side together. The coupling surface of the cemented lens C31 has a concave surface toward the image side, and the incident angles of marginal axial light rays with respect to the coupling surface are small. Therefore, higher order spherical aberration and differences in spherical aberration depending on wavelength will be unlikely to be generated. The coupling surface of the cemented lens C32 has a concave surface toward the object side, and the incident angles of principal off axis light rays with respect to the coupling surface are small. Therefore, the generation of astigmatism and inversion of lateral chromatic aberration (excessive correction) will be unlikely to occur. Between the two cemented lenses, the cemented lens C31 toward the object side has a higher height of marginal axial rays, and the cemented lens C32 toward the image side has a higher height of principal light rays at a maximum angle of view. Therefore, the operative effects of the coupling surface can be utilized effectively. The third lens group G3 has a positive refractive power as a whole. Distributing positive refractive power with the second lens group is advantageous from the viewpoint of correcting spherical aberration.

In the imaging lens of Example 1, the second lens group G2 and the third lens group G3 move integrally toward the object side during focusing operations. Thereby, the focusing mechanism can be simplified. In addition to the advantages with respect to correcting aberrations, the weight of the focusing lenses can be reduced compared to a case in which the entirety of the lens system is fed out. Therefore, adopting an automatic focus configuration is facilitated.

Basic lens data are shown in Table 1, data related to various items are shown in Table 2, and data related to distances among moving surfaces are shown in Table 3, for the imaging lens of Example 1. In the following description, the meanings of the symbols in the tables will be described for Example 1. The meanings of the symbols are basically the same for Examples 2 through 8. Note that the numerical values shown in Tables 1 through 25 below and the aberration diagrams of FIGS. 10 through 17 are those for a state in which the focal length of the entire lens system when focused on an object at infinity is normalized to be 1.0.

In the lens data of Table 1, surface numbers that sequentially increase from the object side to the image side, with the surface of the constituent element at the most object side designated as first, are shown in the column for surface numbers. The radii of curvature of each of the surfaces are shown in the column for radii of curvature, the distances between a surface and an adjacent surface along the optical axis Z are shown in the column for distances. The refractive indices of each optical element with respect to the d line (wavelength: 587.6 nm) are shown in the column nd. The Abbe's numbers of each optical element with respect to the d line (wavelength: 587.6 nm) are shown in the column vd.

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop St. In addition, DD [i] is shown in the rows for distances that change when changing magnification in the lens data of Table 1. Numerical values that correspond to DD [i] are shown in Table 3.

Table 2 shows the values of the angular magnification rate β, the back focus Bf, the F value (FNo.), and the full angle of view 2ω in a state focused on an object at infinity, in a state focused on an object at an intermediate distance, and in a state focused on an object at a most proximal distance, as the data related to various items.

In the basic lens data and the data related to various items, degrees are used as the units for angles. The other values are normalized, and therefore no units are employed for these values.

TABLE 1

Example 1: Lens Data

| Surface Number | Radius of Curvature | Distance | nd | vd |
|---|---|---|---|---|
| 1 | 5.66566 | 0.309 | 1.88300 | 40.76 |
| 2 | 12.57474 | 0.012 | | |
| 3 | 3.14138 | 0.124 | 1.85478 | 24.80 |
| 4 | 1.33853 | 0.505 | | |
| 5 | 2.68631 | 0.111 | 1.91082 | 35.25 |
| 6 | 1.40707 | 0.457 | | |
| 7 | −148.33248 | 0.330 | 1.91082 | 35.25 |
| 8 | 1.96256 | 0.748 | | |
| 9 | 8.67182 | 0.371 | 1.91082 | 35.25 |
| 10 | −4.87046 | 0.639 | | |
| 11 | 2.93768 | 0.199 | 1.85478 | 24.80 |
| 12 | −51.04335 | 0.309 | 1.49700 | 81.54 |
| 13 | 2.09282 | DD [13] | | |
| 14 | 1.51965 | 0.368 | 1.49700 | 81.54 |
| 15 | −123.23993 | 0.152 | | |
| 16 (aperture stop) | ∞ | 0.145 | | |
| 17 | 3.40692 | 0.094 | 1.91082 | 35.25 |
| 18 | 1.07025 | 0.380 | 1.49700 | 81.54 |
| 19 | −4.43473 | 0.019 | | |
| 20 | 3.81660 | 0.290 | 1.49700 | 81.54 |
| 21 | −1.21240 | 0.093 | 1.85478 | 24.80 |
| 22 | −2.91278 | DD [22] | | |
| 23 | ∞ | 0.142 | 1.51680 | 64.20 |
| 24 | ∞ | 2.080 | | |

TABLE 2

Example 1: Items (d Line)

| Focus Position | Infinity | Intermediate | Proximate |
|---|---|---|---|
| β | 0 | −0.026 | −0.134 |
| Bf | 2.08 | 2.05 | 1.94 |
| FNo. | 1.90 | 1.92 | 2.00 |
| 2ω[°] | 95.2 | 94.4 | 91.2 |

TABLE 3

Example 1: Variable Distances

| Focus Position | Infinity | Intermediate | Proximate |
|---|---|---|---|
| DD [13] | 0.781 | 0.752 | 0.627 |
| DD [22] | 0.124 | 0.153 | 0.278 |

Diagrams that illustrate various aberrations of the imaging lens of Example 1 are illustrated in FIG. 10. Note that the diagrams in the upper portion of FIG. 10 illustrate spherical aberration, astigmatism, distortion, and lateral chromatic aberration in a state focused on an object at infinity from the left to the right of the drawing sheet, the diagrams in the middle portion of FIG. 10 illustrate spherical aberration, astigmatism, distortion, and lateral chromatic aberration in a state focused on an object at an intermediate distance from the left to the right of the drawing sheet, and the diagrams in the lower portion of FIG. 10 illustrate spherical aberration, astigmatism, distortion, and lateral chromatic aberration in a state focused on an object at a most proximal distance from the left to the right of the drawing sheet. The diagrams that illustrate spherical aberration, astigmatism, and distortion show aberrations related to the d line (wavelength: 587.6 nm). The diagrams that illustrate spherical aberration show aberrations related to the d line (wavelength: 587.6 nm), aberrations related to the C line (wavelength: 656.3 nm), and aberrations related to the F line (wavelength: 486.1 nm), as solid lines, broken lines, and dotted lines, respectively. In the diagrams that illustrate astigmatism, aberrations in the sagittal direction are indicated by solid lines, while aberrations in the tangential direction are indicated by dotted lines. In the diagram that illustrates lateral chromatic aberration, aberrations related to the C line (wavelength: 656.3 nm), aberrations related to the F line (wavelength: 486.1 nm), and aberrations related to the g line (wavelength: 435.8 nm) are shown as broken lines, dotted lines, and single dot chain lines, respectively. Note that in the diagrams that illustrate spherical aberrations, "FNo." denotes F values. In the other diagrams that illustrate the aberrations, "ω" denotes half angles of view.

The symbols, meanings, and the manners in which each item of data is shown in the description of Example 1 applies to the other Examples unless particularly noted. Therefore, redundant descriptions will be omitted hereinbelow.

Next, an imaging lens of Example 2 will be described. FIG. 2 is a cross sectional diagram that illustrates the lens configuration of the imaging lens of Example 2. In addition, basic lens data are shown in Table 4, data related to various items are shown in Table 5, and data related to distances among movable surfaces are shown in Table 6 for the imaging lens of Example 2. Various aberrations of the imaging lens of Example 2 are illustrated in the diagrams of FIG. 11. The operative effects of each of the lenses of Example 2 are the same as those of Example 1. In the imaging lens of Example 2, the second lens group G2 and the third lens group G3 move along different trajectories when changing focus from an object at infinity to an object at a close distance. At this time, the second lens group G2 and the third lens group G3 move to approach each other. Thereby, fluctuations in astigmatism during focusing operations can be suppressed.

TABLE 4

Example 2: Lens Data

| Surface Number | Radius of Curvature | Distance | nd | νd |
|---|---|---|---|---|
| 1 | 5.36932 | 0.305 | 1.88300 | 40.76 |
| 2 | 12.20045 | 0.012 | | |
| 3 | 3.23916 | 0.122 | 1.85478 | 24.80 |
| 4 | 1.30662 | 0.439 | | |
| 5 | 2.46103 | 0.181 | 1.91082 | 35.25 |
| 6 | 1.30494 | 0.508 | | |
| 7 | −5.08388 | 0.504 | 1.91082 | 35.25 |
| 8 | 2.47203 | 0.311 | | |
| 9 | 23.42815 | 0.212 | 1.91082 | 35.25 |
| 10 | −3.14940 | 0.734 | | |
| 11 | 3.18383 | 0.293 | 1.85478 | 24.80 |
| 12 | −5.27857 | 0.305 | 1.49700 | 81.54 |
| 13 | 2.36962 | DD [13] | | |
| 14 | 1.54175 | 0.373 | 1.49700 | 81.54 |
| 15 | −9.91032 | DD [15] | | |
| 16 (aperture stop) | ∞ | 0.146 | | |
| 17 | 3.19236 | 0.093 | 1.91082 | 35.25 |
| 18 | 1.02704 | 0.323 | 1.49700 | 81.54 |
| 19 | −4.31127 | 0.018 | | |
| 20 | 6.43568 | 0.238 | 1.49700 | 81.54 |
| 21 | −1.13413 | 0.284 | 1.85478 | 24.80 |
| 22 | −2.46543 | DD [22] | | |
| 23 | ∞ | 0.140 | 1.51680 | 64.20 |
| 24 | ∞ | 2.090 | | |

TABLE 5

Example 2: Items (d Line)

| Focus Position | Infinity | Intermediate | Proximate |
|---|---|---|---|
| β | 0 | −0.026 | −0.134 |
| Bf | 2.09 | 2.08 | 1.96 |
| FNo. | 1.93 | 1.97 | 2.06 |
| 2ω[°] | 94.8 | 94.2 | 92.2 |

TABLE 6

Example 2: Variable Distances

| Focus Position | Infinity | Intermediate | Proximate |
|---|---|---|---|
| DD [13] | 0.827 | 0.811 | 0.800 |
| DD [15] | 0.103 | 0.091 | 0.083 |
| DD [22] | 0.131 | 0.151 | 0.278 |

Next, an imaging lens of Example 3 will be described. FIG. 3 is a cross sectional diagram that illustrates the lens configuration of the imaging lens of Example 3. In addition, basic lens data are shown in Table 7, data related to various items are shown in Table 8, and data related to distances among movable surfaces are shown in Table 9 for the imaging lens of Example 3. Various aberrations of the imaging lens of Example 3 are illustrated in the diagrams of FIG. 12. The imaging lens of Example 3 is the same as that of Example 1, except that a positive lens L16 and a negative lens L17 are not cemented together, but are individual lenses. The degree of freedom in correcting aberrations can be increased by separating the positive lens L16 and the negative lens L17.

TABLE 7

Example 3: Lens Data

| Surface Number | Radius of Curvature | Distance | nd | vd |
|---|---|---|---|---|
| 1 | 5.84121 | 0.361 | 1.88300 | 40.76 |
| 2 | 12.86741 | 0.012 | | |
| 3 | 3.28023 | 0.140 | 1.85478 | 24.80 |
| 4 | 1.34604 | 0.489 | | |
| 5 | 2.73183 | 0.112 | 1.91082 | 35.25 |
| 6 | 1.39962 | 0.484 | | |
| 7 | −11.93295 | 0.119 | 1.91082 | 35.25 |
| 8 | 2.73620 | 0.932 | | |
| 9 | 8.85624 | 0.373 | 1.91082 | 35.25 |
| 10 | −4.04999 | 0.422 | | |
| 11 | 3.10213 | 0.166 | 1.85478 | 24.80 |
| 12 | 25.98490 | 0.093 | | |
| 13 | −5.94868 | 0.093 | 1.49700 | 81.54 |
| 14 | 2.84430 | DD [14] | | |
| 15 | 1.62496 | 0.359 | 1.49700 | 81.54 |
| 16 | −16.63062 | 0.425 | | |
| 17 (aperture stop) | ∞ | 0.032 | | |
| 18 | 2.58141 | 0.119 | 1.91082 | 35.25 |
| 19 | 1.04656 | 0.333 | 1.49700 | 81.54 |
| 20 | −6.77778 | 0.019 | | |
| 21 | 3.66236 | 0.313 | 1.49700 | 81.54 |
| 22 | −1.13568 | 0.405 | 1.85478 | 24.80 |
| 23 | −3.07573 | DD [23] | | |
| 24 | ∞ | 0.143 | 1.51680 | 64.20 |
| 25 | ∞ | 1.787 | | |

TABLE 8

Example 3: Items (d Line)

| Focus Position | Infinity | Intermediate | Proximate |
|---|---|---|---|
| β | 0 | −0.026 | −0.134 |
| Bf | 1.79 | 1.76 | 1.65 |
| FNo. | 1.90 | 1.92 | 1.98 |
| 2ω[°] | 95.4 | 94.6 | 91.2 |

TABLE 9

Example 3: Variable Distances

| Focus Position | Infinity | Intermediate | Proximate |
|---|---|---|---|
| DD [14] | 0.959 | 0.930 | 0.805 |
| DD [23] | 0.124 | 0.153 | 0.278 |

Next, an imaging lens of Example 4 will be described. FIG. 4 is a cross sectional diagram that illustrates the lens configuration of the imaging lens of Example 4. In addition, basic lens data are shown in Table 10, data related to various items are shown in Table 11, and data related to distances among movable surfaces are shown in Table 12 for the imaging lens of Example 4. Various aberrations of the imaging lens of Example 4 are illustrated in the diagrams of FIG. 13. The imaging lens of Example 4 is the same as that of Example 2, except that a positive lens L16 and a negative lens L17 are not cemented together, but are individual lenses. The heights of principal off axis rays of light can be increased by separating the positive lens L16 and the negative lens L17 to a greater degree. Such a configuration is advantageous from the viewpoint of correcting distortion and lateral chromatic aberration.

TABLE 10

Example 4: Lens Data

| Surface Number | Radius of Curvature | Distance | nd | vd |
|---|---|---|---|---|
| 1 | 7.82543 | 0.310 | 1.88300 | 40.76 |
| 2 | 16.67486 | 0.012 | | |
| 3 | 2.63556 | 0.124 | 1.85478 | 24.80 |
| 4 | 1.32237 | 0.522 | | |
| 5 | 3.31685 | 0.111 | 1.91082 | 35.25 |
| 6 | 1.34111 | 0.488 | | |
| 7 | −452.88055 | 0.096 | 1.91082 | 35.25 |
| 8 | 2.44872 | 0.927 | | |
| 9 | 16.82541 | 0.236 | 1.91082 | 35.25 |
| 10 | −4.69176 | 0.887 | | |
| 11 | 2.88994 | 0.223 | 1.85478 | 24.80 |
| 12 | 32.10018 | 0.736 | | |
| 13 | 13.07951 | 0.093 | 1.49700 | 81.54 |
| 14 | 1.84019 | DD [14] | | |
| 15 | 1.36836 | 0.344 | 1.49700 | 81.54 |
| 16 | −30.13395 | DD [16] | | |
| 17 (aperture stop) | ∞ | 0.097 | | |
| 18 | 5.86699 | 0.094 | 1.91082 | 35.25 |
| 19 | 1.07588 | 0.341 | 1.49700 | 81.54 |
| 20 | −6.21528 | 0.019 | | |
| 21 | 2.29017 | 0.312 | 1.49700 | 81.54 |
| 22 | −1.18871 | 0.162 | 1.85478 | 24.80 |
| 23 | −2.57380 | DD [23] | | |
| 24 | ∞ | 0.142 | 1.51680 | 64.20 |
| 25 | ∞ | 2.099 | | |

TABLE 11

Example 4: Items (d Line)

| Focus Position | Infinity | Intermediate | Proximate |
|---|---|---|---|
| B | 0 | −0.026 | −0.134 |
| Bf | 2.10 | 2.08 | 1.98 |
| FNo. | 1.92 | 1.94 | 2.06 |
| 2ω[°] | 96.8 | 96.8 | 92.4 |

TABLE 12

Example 4: Variable Distances

| Focus Position | Infinity | Intermediate | Proximate |
|---|---|---|---|
| DD [14] | 0.185 | 0.214 | 0.038 |
| DD [16] | 0.089 | 0.083 | 0.073 |
| DD [23] | 0.133 | 0.154 | 0.282 |

Figure 14:
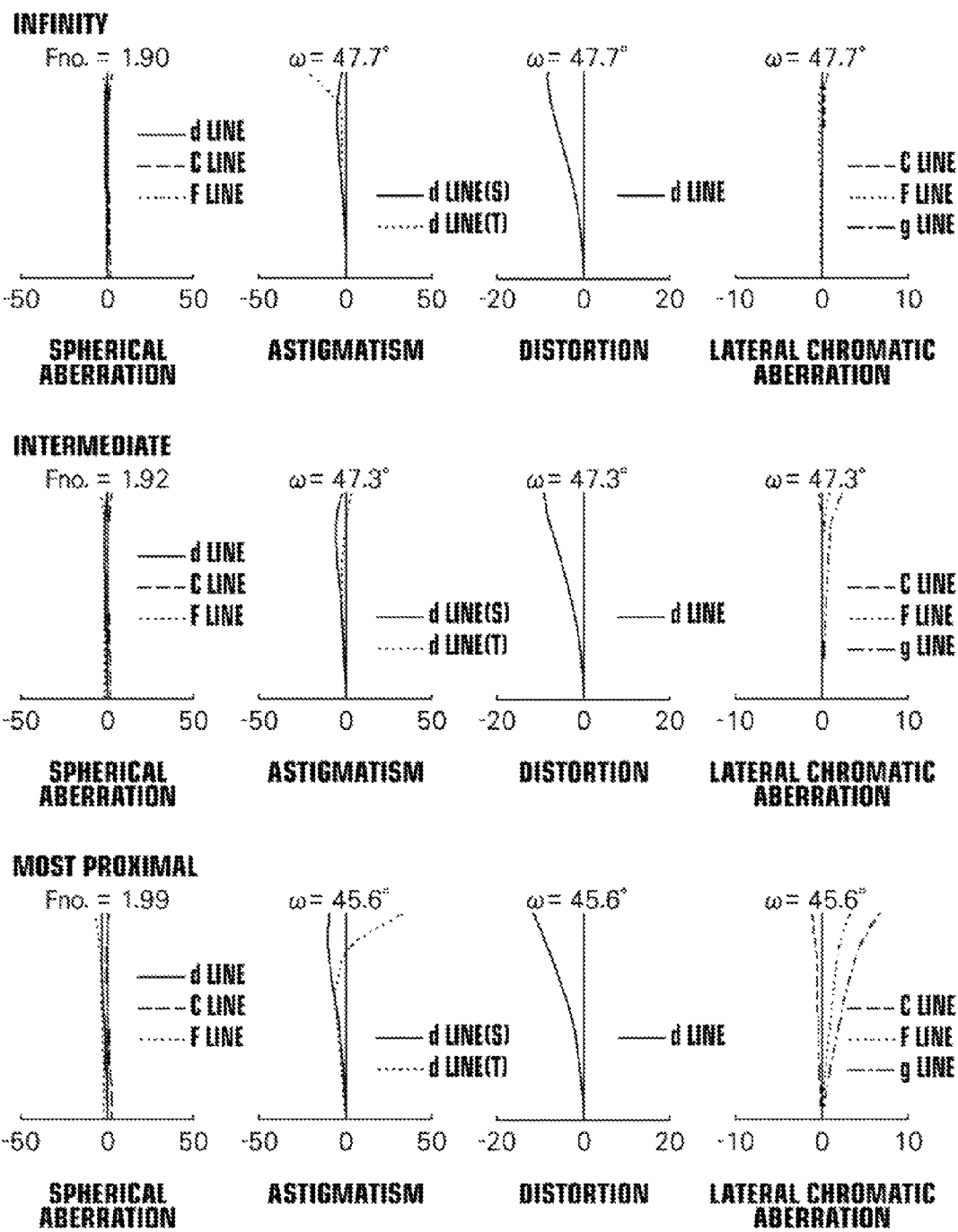
FIG. 14 is a collection of diagrams that illustrate aberrations of the imaging lens of Example 5 of the present disclosure.

Next, an imaging lens of Example 5 will be described. FIG. 5 is a cross sectional diagram that illustrates the lens configuration of the imaging lens of Example 5. In addition, basic lens data are shown in Table 13, data related to various items are shown in Table 14, and data related to distances among movable surfaces are shown in Table 15 for the imaging lens of Example 5. Various aberrations of the imaging lens of Example 5 are illustrated in the diagrams of FIG. 14. In the imaging lens of Example 5, a lens L16 is a negative meniscus lens having a convex surface toward the image side. Thereby, the number of positive lenses can be decreased by one compared to the imaging lens of Example 1. This configuration is advantageous from the viewpoint of shortening the total length of the lens system.

TABLE 13

Example 5: Lens Data

| Surface Number | Radius of Curvature | Distance | nd | νd |
|---|---|---|---|---|
| 1 | 6.98997 | 0.311 | 1.88300 | 40.76 |
| 2 | 17.66342 | 0.012 | | |
| 3 | 3.73134 | 0.268 | 1.85478 | 24.80 |
| 4 | 1.40492 | 0.389 | | |
| 5 | 2.53871 | 0.112 | 1.91082 | 35.25 |
| 6 | 1.43299 | 0.328 | | |
| 7 | 5.13356 | 0.093 | 1.91082 | 35.25 |
| 8 | 1.78202 | 1.650 | | |
| 9 | 6.53990 | 0.198 | 1.85478 | 24.80 |
| 10 | −4.41654 | 0.093 | | |
| 11 | −2.49440 | 0.282 | 1.49700 | 81.54 |
| 12 | −4.82324 | DD [12] | | |
| 13 | 1.71411 | 0.362 | 1.49700 | 81.54 |
| 14 | −54.33952 | 0.719 | | |
| 15 (aperture stop) | ∞ | 0.031 | | |
| 16 | 2.00916 | 0.094 | 1.91082 | 35.25 |
| 17 | 1.01480 | 0.301 | 1.49700 | 81.54 |
| 18 | −9.42716 | 0.019 | | |
| 19 | 3.85319 | 0.294 | 1.49700 | 81.54 |
| 20 | −1.15962 | 0.093 | 1.85478 | 24.80 |
| 21 | −4.40029 | DD [21] | | |
| 22 | ∞ | 0.143 | 1.51680 | 64.20 |
| 23 | ∞ | 1.816 | | |

TABLE 14

Example 5: Items (d Line)

| Focus Position | Infinity | Intermediate | Proximate |
|---|---|---|---|
| β | 0 | −0.026 | −0.134 |
| Bf | 1.82 | 1.79 | 1.68 |
| FNo. | 1.90 | 1.92 | 1.99 |
| 2ω[°] | 95.4 | 94.6 | 91.2 |

TABLE 15

Example 5: Variable Distances

| Focus Position | Infinity | Intermediate | Proximate |
|---|---|---|---|
| DD [12] | 0.751 | 0.722 | 0.602 |
| DD [21] | 0.124 | 0.153 | 0.273 |

Next, an imaging lens of Example 6 will be described. FIG. 6 is a cross sectional diagram that illustrates the lens configuration of the imaging lens of Example 6. In addition, basic lens data are shown in Table 16, data related to various items are shown in Table 17, and data related to distances among movable surfaces are shown in Table 18 for the imaging lens of Example 6. Various aberrations of the imaging lens of Example 6 are illustrated in the diagrams of FIG. 15. The imaging lens of Example 6 is the same as that of Example 1, except that the third lens group G3 has a negative refractive power, and that a positive meniscus lens L35 having a convex surface toward the image side is provided toward the image side of a negative meniscus lens L34. An approximately symmetrical power arrangement with respect to the aperture stop St can be achieved with the first lens group G1, by configuring the third lens group G3 to have a negative refractive power. This configuration is advantageous from the viewpoint of correcting distortion and lateral chromatic aberration. In addition, adding the positive meniscus lens L35 is advantageous not only from the viewpoint of correcting spherical aberration, but also from the viewpoint of shortening the total length of the lens system.

TABLE 16

Example 6: Lens Data

| Surface Number | Radius of Curvature | Distance | nd | νd |
|---|---|---|---|---|
| 1 | 5.27381 | 0.395 | 1.88300 | 40.76 |
| 2 | 12.15032 | 0.091 | | |
| 3 | 3.78360 | 0.122 | 1.85478 | 24.80 |
| 4 | 1.31081 | 0.344 | | |
| 5 | 2.07393 | 0.135 | 1.91082 | 35.25 |
| 6 | 1.28935 | 0.509 | | |
| 7 | −7.38660 | 0.232 | 1.91082 | 35.25 |
| 8 | 2.21930 | 0.735 | | |
| 9 | 41.47777 | 0.241 | 1.91082 | 35.25 |
| 10 | −3.76655 | 0.766 | | |
| 11 | 4.38390 | 0.197 | 1.85478 | 24.80 |
| 12 | −8.74635 | 0.212 | | |
| 13 | 16.03948 | DD [13] | | |
| 14 | 1.41100 | 0.361 | 1.49700 | 81.54 |
| 15 | −18.54001 | 0.101 | | |
| 16 (aperture stop) | ∞ | 0.119 | | |
| 17 | 3.05814 | 0.092 | 1.91082 | 35.25 |
| 18 | 0.87581 | 0.318 | 1.49700 | 81.54 |
| 19 | −24.95087 | 0.018 | | |
| 20 | 4.65298 | 0.268 | 1.49700 | 81.54 |
| 21 | −1.07554 | 0.091 | 1.85478 | 24.80 |
| 22 | −2.59593 | 0.040 | | |
| 23 | −3.25512 | 0.091 | 1.59270 | 35.31 |
| 24 | −3.07640 | DD [24] | | |
| 25 | ∞ | 0.140 | 1.51680 | 64.20 |
| 26 | ∞ | 1.764 | | |

TABLE 17

Example 6: Items (d Line)

| Focus Position | Infinity | Intermediate | Proximate |
|---|---|---|---|
| β | 0 | −0.026 | −0.134 |
| Bf | 1.76 | 1.74 | 1.64 |
| FNo. | 1.91 | 1.93 | 1.99 |
| 2ω[°] | 95.6 | 95.0 | 92.6 |

TABLE 18

Example 6: Variable Distances

| Focus Position | Infinity | Intermediate | Proximate |
|---|---|---|---|
| DD [13] | 1.010 | 0.984 | 0.881 |
| DD [24] | 0.122 | 0.148 | 0.251 |

Next, an imaging lens of Example 7 will be described. FIG. 7 is a cross sectional diagram that illustrates the lens configuration of the imaging lens of Example 7. In addition, basic lens data are shown in Table 19, data related to various items are shown in Table 20, and data related to distances among movable surfaces are shown in Table 21 for the imaging lens of Example 7. Various aberrations of the imaging lens of Example 7 are illustrated in the diagrams of FIG. 16. The imaging lens of Example 7 is the same as that of Example 1, except that a cemented lens formed by cementing a biconcave lens L15 and a biconvex lens L16 together is inserted toward the image side of a negative lens L14 within the first lens group G1, and that the second lens group G2 is constituted by three lenses. Inserting the cemented lens formed by cementing the biconcave lens L15 and the biconvex lens L16 together into the first lens group G1 is advantageous from the viewpoint of correcting lateral chromatic aberration. In addition, providing a cemented lens formed by cementing a biconvex lens L21 and a biconcave lens L22 in the second lens group G2 is advantageous from the viewpoint of suppressing fluctuations in longitudinal chromatic aberrations caused by focusing operations.

TABLE 19

Example 7: Lens Data

| Surface Number | Radius of Curvature | Distance | nd | vd |
|---|---|---|---|---|
| 1 | 6.37503 | 0.315 | 1.88300 | 40.76 |
| 2 | 13.72279 | 0.013 | | |
| 3 | 3.10678 | 0.126 | 1.85478 | 24.80 |
| 4 | 1.30597 | 0.459 | | |
| 5 | 2.34742 | 0.157 | 1.91082 | 35.25 |
| 6 | 1.38841 | 0.473 | | |
| 7 | −32.70562 | 0.095 | 1.91082 | 35.25 |
| 8 | 2.11995 | 0.293 | | |
| 9 | −11.14211 | 0.096 | 1.63058 | 59.97 |
| 10 | 3.79598 | 0.284 | 1.72590 | 28.70 |
| 11 | −3.97876 | 1.268 | | |
| 12 | 6.82339 | 0.148 | 1.85478 | 24.80 |
| 13 | −18.18073 | DD [13] | | |
| 14 | 3.23293 | 0.263 | 1.51023 | 53.08 |
| 15 | −10.20067 | 0.117 | 1.42999 | 90.77 |
| 16 | 3.92687 | 0.053 | | |
| 17 | 1.69118 | 0.404 | 1.42999 | 81.02 |
| 18 | −18.93430 | 0.450 | | |
| 19 (aperture stop) | ∞ | 0.031 | | |
| 20 | 2.38268 | 0.096 | 1.91082 | 35.25 |
| 21 | 1.02240 | 0.377 | 1.49700 | 81.55 |
| 22 | −14.35422 | 0.019 | | |
| 23 | 4.51533 | 0.332 | 1.49700 | 81.55 |
| 24 | −1.22033 | 0.095 | 1.85478 | 24.80 |
| 25 | −3.51171 | DD [25] | | |
| 26 | ∞ | 0.145 | 1.51680 | 64.20 |
| 27 | ∞ | 1.633 | | |

TABLE 20

Example 7: Items (d Line)

| Focus Position | Infinity | Intermediate | Proximate |
|---|---|---|---|
| β | 0 | −0.026 | −0.134 |
| Bf | 1.63 | 1.61 | 1.50 |
| FNo. | 1.90 | 1.92 | 1.98 |
| 2ω[°] | 97.0 | 96.2 | 93.0 |

TABLE 21

Example 7: Variable Distances

| Focus Position | Infinity | Intermediate | Proximate |
|---|---|---|---|
| DD [13] | 0.735 | 0.706 | 0.582 |
| DD [25] | 0.466 | 0.495 | 0.619 |

Figure 17:
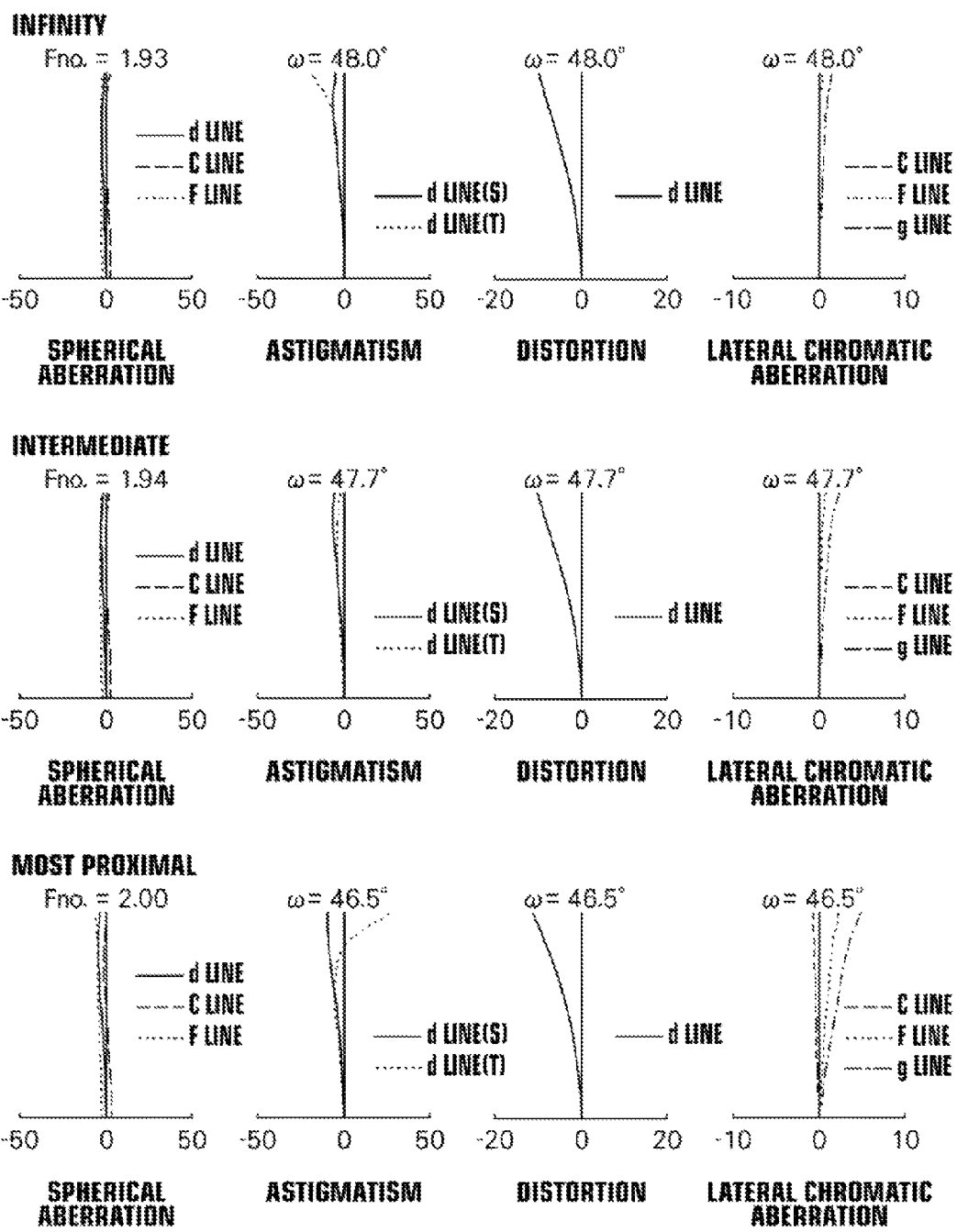
FIG. 17 is a collection of diagrams that illustrate aberrations of the imaging lens of Example 8 of the present disclosure.

Next, an imaging lens of Example 8 will be described. FIG. 8 is a cross sectional diagram that illustrates the lens configuration of the imaging lens of Example 8. In addition, basic lens data are shown in Table 22, data related to various items are shown in Table 23, and data related to distances among movable surfaces are shown in Table 24 for the imaging lens of Example 8. Various aberrations of the imaging lens of Example 8 are illustrated in the diagrams of FIG. 17. The imaging lens of Example 8 has the same lens configuration as that of Example 1, except that the material of the positive lens L11 provided most toward the object side and the material of the negative meniscus lens L34 provided most toward the image side are changed.

TABLE 22

Example 8: Lens Data

| Surface Number | Radius of Curvature | Distance | nd | vd |
|---|---|---|---|---|
| 1 | 12.02006 | 0.314 | 1.85150 | 40.78 |
| 2 | 31.33904 | 0.013 | | |
| 3 | 2.70507 | 0.128 | 1.85150 | 40.78 |
| 4 | 1.46725 | 0.521 | | |
| 5 | 4.27702 | 0.111 | 1.91082 | 35.25 |
| 6 | 1.65011 | 0.444 | | |
| 7 | −12.53772 | 0.123 | 1.91082 | 35.25 |
| 8 | 3.05239 | 1.235 | | |
| 9 | −53.54144 | 0.420 | 1.91082 | 35.25 |
| 10 | −3.47862 | 0.744 | | |
| 11 | 3.84344 | 0.137 | 1.85150 | 40.78 |
| 12 | 59.40322 | 0.140 | | |
| 13 | −4.32759 | 0.172 | 1.49700 | 81.54 |
| 14 | 11.47137 | DD [14] | | |
| 15 | 1.73343 | 0.374 | 1.49700 | 81.54 |
| 16 | −15.72439 | 0.009 | | |
| 17 (aperture stop) | ∞ | 0.569 | | |
| 18 | 2.29189 | 0.094 | 1.91082 | 35.25 |
| 19 | 0.95791 | 0.292 | 1.49700 | 81.54 |
| 20 | 10.33103 | 0.019 | | |
| 21 | 4.28804 | 0.278 | 1.49700 | 81.54 |
| 22 | −1.15174 | 0.184 | 1.90366 | 31.31 |
| 23 | −2.45080 | DD [23] | | |
| 24 | ∞ | 0.142 | 1.51680 | 64.20 |
| 25 | ∞ | 1.543 | | |

TABLE 23

Example 8: Items (d Line)

| Focus Position | Infinity | Intermediate | Proximate |
|---|---|---|---|
| β | 0 | −0.026 | −0.134 |
| Bf | 1.54 | 1.52 | 1.41 |
| FNo. | 1.93 | 1.94 | 2.00 |
| 2ω[°] | 96.0 | 95.4 | 93.0 |

TABLE 24

Example 8: Variable Distances

| Focus Position | Infinity | Intermediate | Proximate |
|---|---|---|---|
| DD [14] | 0.939 | 0.912 | 0.802 |
| DD [23] | 0.497 | 0.524 | 0.634 |

Values corresponding to Conditional Formulae (1) through (8) for the imaging lenses of Examples 1 through 8 are shown in Table 25. Note that all of the Examples use the d line as a reference wavelength, and the values shown in Table 25 below are those for the reference wavelength.

TABLE 25

| | Formula Condition | Example 1 | Example 2 | Example 3 | Example 4 | Example 5 | Example 6 | Example 7 | Example 8 |
|---|---|---|---|---|---|---|---|---|---|
| (1) | (R1f − R1r)/(R1f + R1r) | −0.379 | −0.389 | −0.376 | −0.361 | −0.433 | −0.395 | −0.366 | −0.446 |
| (2) | f1/f3 | −0.414 | −0.339 | −0.438 | −0.347 | −0.421 | 0.772 | −0.249 | −0.384 |
| (3) | f2/f3 | 0.407 | 0.347 | 0.439 | 0.330 | 0.428 | −0.052 | 0.260 | 0.219 |

TABLE 25-continued

| Formula | Condition | Example 1 | Example 2 | Example 3 | Example 4 | Example 5 | Example 6 | Example 7 | Example 8 |
|---|---|---|---|---|---|---|---|---|---|
| (4) | f/f23 | 0.417 | 0.436 | 0.418 | 0.441 | 0.393 | 0.338 | 0.379 | 0.353 |
| (5) | (R2f − R2r)/(R2f + R2r) | −1.025 | −1.368 | −1.217 | −1.095 | −1.065 | −1.165 | −1.196 | −1.248 |
| (6) | vp3 − vn3 | 56.740 | 56.740 | 56.740 | 56.740 | 56.740 | 56.740 | 56.740 | 50.240 |
| (7) | nd1 | 1.883 | 1.883 | 1.883 | 1.883 | 1.883 | 1.883 | 1.883 | 1.852 |
| (7) | −0.005vd1 + 2.01 | 1.806 | 1.806 | 1.806 | 1.806 | 1.806 | 1.806 | 1.806 | 1.806 |
| (8) | vd1 | 40.760 | 40.760 | 40.760 | 40.760 | 40.760 | 40.760 | 40.760 | 40.780 |

The above data indicate that all of the imaging lenses of Examples 1 through 8 satisfy Conditional Formulae (1) through (8). Therefore, it can be understood that the imaging lenses of the Examples are those having wide angles of view, with the full angles of view when focused on an object at infinity being approximately 95° or greater, and in which various aberrations are favorably corrected.

Figure 18:
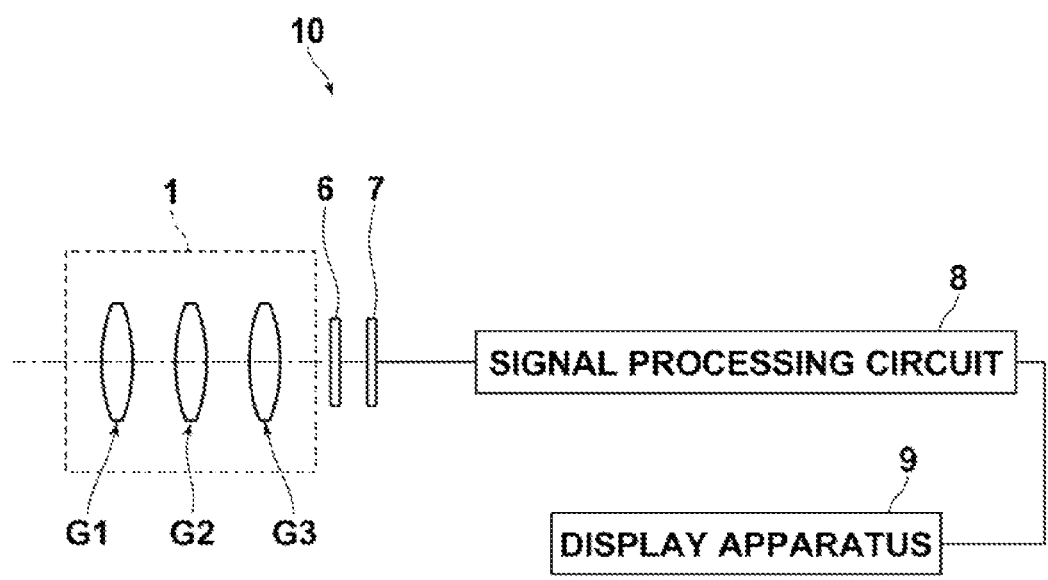
FIG. 18 is a diagram that schematically illustrates an imaging apparatus according to an embodiment of the present disclosure.

Next, an imaging apparatus according to an embodiment of the present disclosure will be described. FIG. 18 is a diagram that illustrates the schematic structure of an imaging apparatus that employs the imaging lens according to the embodiment of the present disclosure. Note that the lens groups are schematically illustrated in FIG. 18. Examples of such an imaging apparatus are a video camera and an electronic still camera that employ a solid state imaging element such as a CCD (Charge Coupled Device) and a CMOS (Complementary Metal Oxide Semiconductor) as a recording medium.

The imaging apparatus 10 illustrated in FIG. 18 is equipped with an imaging lens 1, a filter 6 having the functions of a low pass filter or the like, provided toward the image side of the imaging lens 1, an imaging element 7 provided toward the image side of the filter 6, and a signal processing circuit 8. The imaging element 7 converts optical images formed by the imaging lens 1 into electrical signals. A CCD, a CMOS, or the like may be employed as the imaging element 7. The imaging element 7 is positioned such that the image capturing surface thereof matches the imaging surface of the imaging lens 1.

Images obtained by the imaging lens 1 are formed on the image capturing surface of the imaging element 7, output signals related to the images undergo calculation processes at the signal processing circuit, and the images are displayed on a display apparatus 9.

The imaging apparatus 10 is equipped with the imaging lens 1 according to the embodiment of the present disclosure. Therefore, the imaging apparatus 10 is capable of obtaining images having wide angles of view and high image quality.

The present disclosure has been described with reference to the embodiments and Examples. However, the present disclosure is not limited to the above embodiments and Examples, and various modifications are possible. For example, the numerical values of the radii of curvature, the distances among surfaces, the refractive indices, the Abbe's numbers, etc. of the lens components are not limited to those exemplified in the above Examples, and may be different values.

What is claimed is:

1. An imaging lens consisting of, in order from the object side to the image side:
   a first lens group having a negative refractive power;
   a second lens group having a positive refractive power;
   a stop; and
   a third lens group having one of a positive refractive power and a negative refractive power;
   the first lens group having at least two positive lenses;
   a first positive lens from among the at least two positive lenses being positioned most toward the object side;
   three negative lenses being consecutively provided adjacent to the first positive lens at the image side thereof;
   the first lens group being fixed with respect to an imaging surface, and focusing operations being performed by moving the second lens group and the third lens group;
   a positive lens positioned most toward the image side within the second lens group is designated as a second positive lens; and
   Conditional Formula (5) below is satisfied:

$$-1.7<(R2f-R2r)/(R2f+R2r)<-0.8 \quad (5)$$

wherein R2f is the radius of curvature of the surface toward the object side of the second positive lens, and R2r is the radius of curvature of the surface toward the image side of the second positive lens.

2. An imaging lens as defined in claim 1, in which Conditional Formula (1) below is satisfied:

$$-1.2<(R1f-R1r)/(R1f+R1r)<0 \quad (1)$$

wherein R1f is the radius of curvature of the surface toward the object side of the first positive lens, and R1r is the radius of curvature of the surface toward the image side of the first positive lens.

3. An imaging lens as defined in claim 1, in which Conditional Formula (2) is satisfied:

$$-2.5<f1/f3<2.5 \quad (2)$$

wherein f1 is the focal length of the first lens group, and f3 is the focal length of the third lens group.

4. An imaging lens as defined in claim 1, in which Conditional Formula (3) below is satisfied:

$$-1.5<f2/f3<1.2 \quad (3)$$

wherein f2 is the focal length of the second lens group, and f3 is the focal length of the third lens group.

5. An imaging lens as defined in claim 1, in which Conditional Formula (4) below is satisfied:

$$0.1<f/f23<0.6 \quad (4)$$

wherein f is the focal length of the entire lens system, and f23 is the combined focal length of the second lens group and the third lens group.

6. An imaging lens as defined in claim 1, wherein:
   the third lens group to has, in order from the object side to the image side, a first cemented lens formed by cementing a negative meniscus lens having a convex surface toward the object side and a positive lens, provided in this order from the object side to the image side, together, and a second cemented lens formed by cementing a positive lens and a negative meniscus lens having a convex surface toward the image side, provided in this order from the object side to the image side, together; and Conditional Formula (6) below is satisfied:

$$40 < vp3 - vn3 \leq 56.740 \quad (6)$$

wherein vp3 is the Abbe's number of the positive lens of the second cemented lens with respect to the d line, and vn3 is the Abbe's number of the negative meniscus lens of the second cemented lens with respect to the d line.

7. An imaging lens as defined in claim 1, in which Conditional Formulae (7) and (8) below are satisfied:

$$1.806 \leq -0.005vd1 + 2.01 \leq nd1 \quad (7)$$

$$vd1 < 53 \quad (8)$$

wherein vd1 is the Abbe's number of the first positive lens with respect to the d line, and nd1 is the refractive index of the first positive lens with respect to the d line.

8. An imaging lens as defined in claim 1, wherein: the second lens group and the third lens group approach each other when changing focus from an object at infinity to an object at a close distance.

9. An imaging lens as defined in claim 1, in which Conditional Formula (1-1) is satisfied:

$$-0.8 < (R1f - R1r)/(R1f + R1r) < -0.1 \quad (1-1)$$

wherein R1f is the radius of curvature of the surface toward the object side of the first positive lens, and R1r is the radius of curvature of the surface toward the image side of the first positive lens.

10. An imaging lens as defined in claim 1, in which Conditional Formula (2-1) below is satisfied:

$$-1.5 < f1/f3 < 1.5 \quad (2-1)$$

wherein f1 is the focal length of the first lens group, and f3 is the focal length of the third lens group.

11. An imaging lens as defined in claim 1, in which Conditional Formula (3-1) below is satisfied:

$$-1.2 < f2/f3 < 1 \quad (3-1)$$

wherein f2 is the focal length of the second lens group, and f3 is the focal length of the third lens group.

12. An imaging lens as defined in claim 1, in which Conditional Formula (4-1) below is satisfied:

$$0.2 < f/f23 < 0.5 \quad (4-1)$$

wherein f is the focal length of the entire lens system, and f23 is the combined focal length of the second lens group and the third lens group.

13. An imaging lens as defined in claim 1, wherein: the third lens group to has, in order from the object side to the image side, a first cemented lens formed by cementing a negative meniscus lens having a convex surface toward the object side and a positive lens, provided in this order from the object side to the image side, together, and a second cemented lens formed by cementing a positive lens and a negative meniscus lens having a convex surface toward the image side, provided in this order from the object side to the image side, together; and Conditional Formula (6-1) below is satisfied:

$$50 < vp3 - vn3 \leq 56.740 \quad (6-1)$$

wherein vp3 is the Abbe's number of the positive lens of the second cemented lens with respect to the d line, and vn3 is the Abbe's number of the negative meniscus lens of the second cemented lens with respect to the d line.

14. An imaging lens as defined in claim 1, in which Conditional Formulae (7-1) and (8) below are satisfied:

$$1.806 \leq -0.0059vd1 + 2.061 \leq nd1 \quad (7-1)$$

$$vd1 < 53 \quad (8)$$

wherein vd1 is the Abbe's number of the first positive lens with respect to the d line, and nd1 is the refractive index of the first positive lens with respect to the d line.

15. An imaging apparatus equipped with an imaging lens as defined in claim 1.

* * * * *